(12) United States Patent
Metzger

(10) Patent No.: US 12,384,730 B2
(45) Date of Patent: Aug. 12, 2025

(54) SYSTEM FOR CONSTRUCTING BUILDING MATERIAL FROM LUNAR SOIL AND ASSOCIATED METHOD

(71) Applicant: UNIVERSITY OF CENTRAL FLORIDA RESEARCH FOUNDATION, INC., Orlando, FL (US)

(72) Inventor: Philip Metzger, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 873 days.

(21) Appl. No.: 17/582,062

(22) Filed: Jan. 24, 2022

(65) Prior Publication Data

US 2022/0315497 A1    Oct. 6, 2022

Related U.S. Application Data

(60) Provisional application No. 63/168,290, filed on Mar. 31, 2021.

(51) Int. Cl.
*H05B 6/64* (2006.01)
*B03B 4/00* (2006.01)
(Continued)

(52) U.S. Cl.
CPC ............ *C04B 40/0014* (2013.01); *B03B 4/00* (2013.01); *B03C 1/30* (2013.01); *B03C 2201/20* (2013.01);
(Continued)

(58) Field of Classification Search
CPC ......... B03B 4/00; B03C 1/30; B03C 2201/20; B32B 18/00; C04B 2111/00405; C04B 2235/667; C04B 33/132; C04B 35/62204; C04B 40/0014; E01C 19/22; E01C 21/00; E01C 5/02; E01C 9/001; E01C 9/008; E21C 51/00
(Continued)

(56) References Cited

U.S. PATENT DOCUMENTS 7,723,654 B2    5/2010  Taylor et al.
2004/0123896 A1  7/2004  Lemmon et al.
(Continued)

OTHER PUBLICATIONS

Allan et al., "High-Temperature Microwave Dielectric Properties and Processing of JSC-1AC Lunar Simulant," Journal of Aerospace Engineering; 26(4); Oct. 2013; pp. 874-881.
(Continued)

*Primary Examiner* — Quang T Van
(74) *Attorney, Agent, or Firm* — ALLEN, DYER, DOPPELT +GILCHRIST, P.A.

(57) ABSTRACT

A system and associated method constructs a building material from lunar soil. A magnetic sorter magnetically sorts the lunar soil and the system creates a layered surface comprising a microwave susceptible, thermal conductive top layer of lunar soil and a poorly microwave-susceptible and poorly thermally conductive sublayer of lunar soil. A microwave generator generates microwave energy into an antenna and directs the microwave energy onto the top layer of lunar soil to sinter the microwave susceptible, thermal conductive top layer of lunar soil.

22 Claims, 15 Drawing Sheets

(51) Int. Cl.
    *B03C 1/30*     (2006.01)
    *C04B 40/00*     (2006.01)
    *E01C 9/00*     (2006.01)
    *E01C 19/22*     (2006.01)
    *E01C 21/00*     (2006.01)

(52) U.S. Cl.
    CPC .............. *E01C 9/001* (2013.01); *E01C 9/008* (2013.01); *E01C 19/22* (2013.01); *E01C 21/00* (2013.01)

(58) Field of Classification Search
    USPC .......... 219/679, 680, 748, 760, 761
    See application file for complete search history.

(56) References Cited

U.S. PATENT DOCUMENTS

2009/0071877 A1* 3/2009 Taylor ............... E21C 51/00
                                                                                                     209/214
2019/0310024 A1* 10/2019 Townsend ........... F28D 21/0001
2021/0404338 A1 12/2021 Metzger

OTHER PUBLICATIONS

Fateri et al., "Localized Microwave Thermal Posttreatment of Sintered Samples of Lunar Simulant," Journal of Aerospace Engineering; 32(4); 2019; 04019051; pp. 1-7.

Metzger et al., "Thermal Extraction of Volatiles from Lunar and Asteroid Regolith in Axisymmetric Crank-Nicolson Modeling," Journal of Aerospace Engineering; 33(6); 2020; 04020075; pp. 1-18.

Metzger et al., Corrections: Erratum for "Thermal Extraction of Volatiles from Lunar and Asteroid Regolith in Axisymmetric Crank-Nicolson Modeling," Journal of Aerospace Engineering; 34(5); 2021; 08221002; p. 1.

Phuah et al., "Ceramic Material Processing Towards Future Space Habitat: Electric Current-Assisted Sintering of Lunar Regolith Simulant," Materials; Sep. 2020, 13, 4128; pp. 1-9.

Taylor et al., "Microwave Sintering of Lunar Soil: Properties, Theory and Practice," Journal of Aerospace Engineering; 18(3); Jul. 2005; pp. 188-196.

* cited by examiner

TABLE 1 — MAGNETIC SUSCEPTIBILITY VARIATION OF LUNAR MINERALS

| BRONZITE | | BASALTIC GLASS | | ANORTHOSITE | | OLIVINE | | ILMENITE | |
|---|---|---|---|---|---|---|---|---|---|
| TEMPERATURE (C) | SUSCEPTIBILITY (Xm/10⁻⁶ cm³ mol⁻¹) | TEMPERATURE (C) | SUSCEPTIBILITY (Xm/10⁻⁶ cm³ mol⁻¹) | TEMPERATURE (C) | SUSCEPTIBILITY (Xm/10⁻⁶ cm³ mol⁻¹) | TEMPERATURE (C) | SUSCEPTIBILITY (Xm/10⁻⁶ cm³ mol⁻¹) | TEMPERATURE (C) | SUSCEPTIBILITY (Xm/10⁻⁶ cm³ mol⁻¹) |
| -175 | 196639 | 22 | 160331 | 23 | 439 | 23 | 24695 | 22 | 23418 |
| -120 | 188396 | -38 | 166738 | 12 | 628 | 14 | 24915 | -14 | 32598 |
| -97 | 184311 | -123 | 171722 | -83 | 941 | -67 | 26421 | -100 | 51970 |
| -68 | 183225 | -147 | 173708 | -119 | 1192 | -109 | 28931 | -179 | 76737 |
| -42 | 182138 | -89 | 170373 | -150 | 1538 | -130 | 30500 | -132 | 53619 |
| -27 | 178279 | -65 | 167525 | -178 | 1851 | -156 | 30186 | -90 | 40617 |
| -27 | 181201 | -31 | 166364 | -136 | 1600 | -125 | 28931 | -75 | 37844 |
| -9 | 179365 | -17 | 169661 | -101 | 1538 | -94 | 27770 | -47 | 34172 |
| 1 | 180340 | -2 | 166026 | -44 | 1726 | -66 | 27362 | -22 | 30313 |
| 21 | 175693 | 6 | 166963 | -19 | 1789 | -39 | 26703 | -9 | 28964 |
| 22 | 167825 | 18 | 164041 | 2 | 1161 | -11 | 26515 | 17 | 24655 |
| 41 | 173146 | 67 | 159694 | 18 | 439 | 17 | 24162 | 75 | 20458 |
| 72 | 179478 | 121 | 156547 | 37 | 377 | 47 | 24256 | 100 | 19521 |
| 90 | 174944 | 169 | 155610 | 50 | 3420 | 81 | 22655 | 133 | 16861 |
| 122 | 169324 | 135 | 148004 | 70 | 188 | 103 | 22342 | 168 | 15550 |
| 153 | 167450 | 114 | 162729 | 96 | 126 | 121 | 22687 | 130 | 14988 |
| 127 | 169773 | 88 | 162879 | 114 | 94 | 142 | 21620 | 111 | 16486 |
| 100 | 171684 | 59 | 163891 | 138 | -31 | 124 | 22969 | 82 | 17461 |
| 72 | 170485 | 38 | 166588 | 110 | 63 | 98 | 23220 | 67 | 18922 |
| 56 | 175768 | | | 79 | 157 | 73 | 23346 | 45 | 20721 |
| 37 | 175731 | | | 59 | 188 | 53 | 23848 | 33 | 21470 |
| | | | | 35 | 220 | 37 | 23503 | | |

FIG. 7

SYSTEM FOR CONSTRUCTING BUILDING MATERIAL FROM LUNAR SOIL AND ASSOCIATED METHOD

PRIORITY APPLICATION

This application is based upon provisional application Ser. No. 63/168,290, filed Mar. 31, 2021, the disclosure which is hereby incorporated by reference in its entirety.

FIELD OF THE INVENTION

This invention relates to forming building materials, and more particularly, to constructing a building material from lunar soil, such as lunar regolith.

BACKGROUND OF THE INVENTION

Lunar regolith can be used as a building material for landing pads, radiation protection, meteoroid shields, and similar uses. Various methods of stabilizing the regolith have been proposed, including addition of a polymer binder, making lunar waterless concrete from calcium or another material, baking regolith into pavers or bricks in an oven, and sintering. Studies have recently been performed of landing pad construction techniques as part of the Robotic Lunar Surface Operations study at the Jet Propulsion Lab, and found that each method has its own challenges. Sintering is favored by many for its robotic simplicity, its ability to make a mechanically strong surface, the ability of the sintered material to withstand the high temperature of rocket exhaust, and the fact that binder does not need to be brought from Earth. As a result, it is scalable. Microwave sintering gets excellent depth of penetration from the multiple centimeters up to tens of centimeters (depending on wavelength), enabling single-pass slab construction with outstanding mechanical properties.

A possible challenge with microwave sintering is that the energy requirement is high, which makes microwave sintering slow and/or requires a much larger mass of hardware for power generation and power conversion. Using reasonable estimates based on similar hardware, microwave sintering with 200 kW power available at the lunar outpost may require 8.7 tons of microwave hardware to deliver that energy as quickly as possible, which would mean it would take 250 days to build a single landing pad. It may also require up to 9 small lunar rovers (another 2.7 tons of hardware) to carry that mass of microwaving hardware. During those 250 days, it may be necessary to use the entire 200 kW power supply of an outpost, so no other significant tasks like ISRU (in-situ resource utilization) could take place. To make microwave sintering more economically feasible, the power requirements should be significantly lowered using newly developed techniques.

SUMMARY OF THE INVENTION

A method of constructing a building material from lunar soil includes magnetically sorting the lunar soil and creating a layered surface comprising a microwave susceptible, thermal conductive top layer of lunar soil, and a poorly microwave-susceptible and poorly thermally conductive sublayer of lunar soil. The method includes sintering the microwave susceptible, thermal conductive top layer of lunar soil by directing microwave energy onto the top layer of lunar soil.

In an example, the top layer of lunar soil may comprise a plurality of layers of varying microwave susceptibility to optimize the effectiveness of the microwave sintering. The directing of the microwave energy onto the top layer of lunar soil may include generating microwave energy, and directing the microwave energy through an antenna in a direction onto the top layer of lunar soil. The method may include generating different wavelengths of microwave energy in time corresponding to the changing absorbance of the top layer of the lunar soil as a function of temperature during the heating process of the top layer of lunar soil, and directing the microwave energy of different wavelengths in timed sequence onto the top layer of lunar soil. The top layer of lunar soil is compacted to a greater extent than the sublayer of lunar soil.

In another example, the lunar soil may be magnetically sorted into a non-magnetic isolate to form the sublayer of lunar soil, and into a magnetic isolate to form the top layer of lunar soil. The lunar soil may be pneumatically sorted into a coarse fraction and dust fraction, followed by magnetically sorting the coarse fraction into a magnetic isolate and non-magnetic isolate. The dust fraction may be magnetically sorted into fractions of magnetic dust isolates and mixed with the magnetic isolate before forming the top and sublayers of lunar soil.

A system of constructing a building material from lunar soil may include a magnetic separator that magnetically sorts the lunar soil into a non-magnetic isolate and magnetic isolate and a compactor configured to create a layered surface comprising a microwave susceptible, thermal conductive top layer of lunar soil formed from the magnetic isolate and a poorly microwave-susceptible and poorly thermally conductive sublayer of lunar soil from the non-magnetic isolate.

A microwave generator may be configured to generate microwave energy. An antenna may be connected to the microwave generator and configured to direct the microwave energy against the microwave susceptible, thermal conductive top layer of lunar soil and sinter the top layer of lunar soil.

In an example, the microwave generator may be configured to generate microwave energy to achieve a temperature in the microwave susceptible, thermal conductive top layer of lunar soil of about 1200° K to 1600° K, and generate microwave energy to achieve a thermal conductivity of about 70 to 110 mW/m/K.

DESCRIPTION OF THE DRAWINGS

Other objects, features and advantages of the present invention will become apparent from the detailed description of the invention, which follows when considered in light of the accompanying drawings in which:

FIG. 7 is a table showing an example of magnetic susceptibility variation of lunar materials.

DETAILED DESCRIPTION

Figure 1:
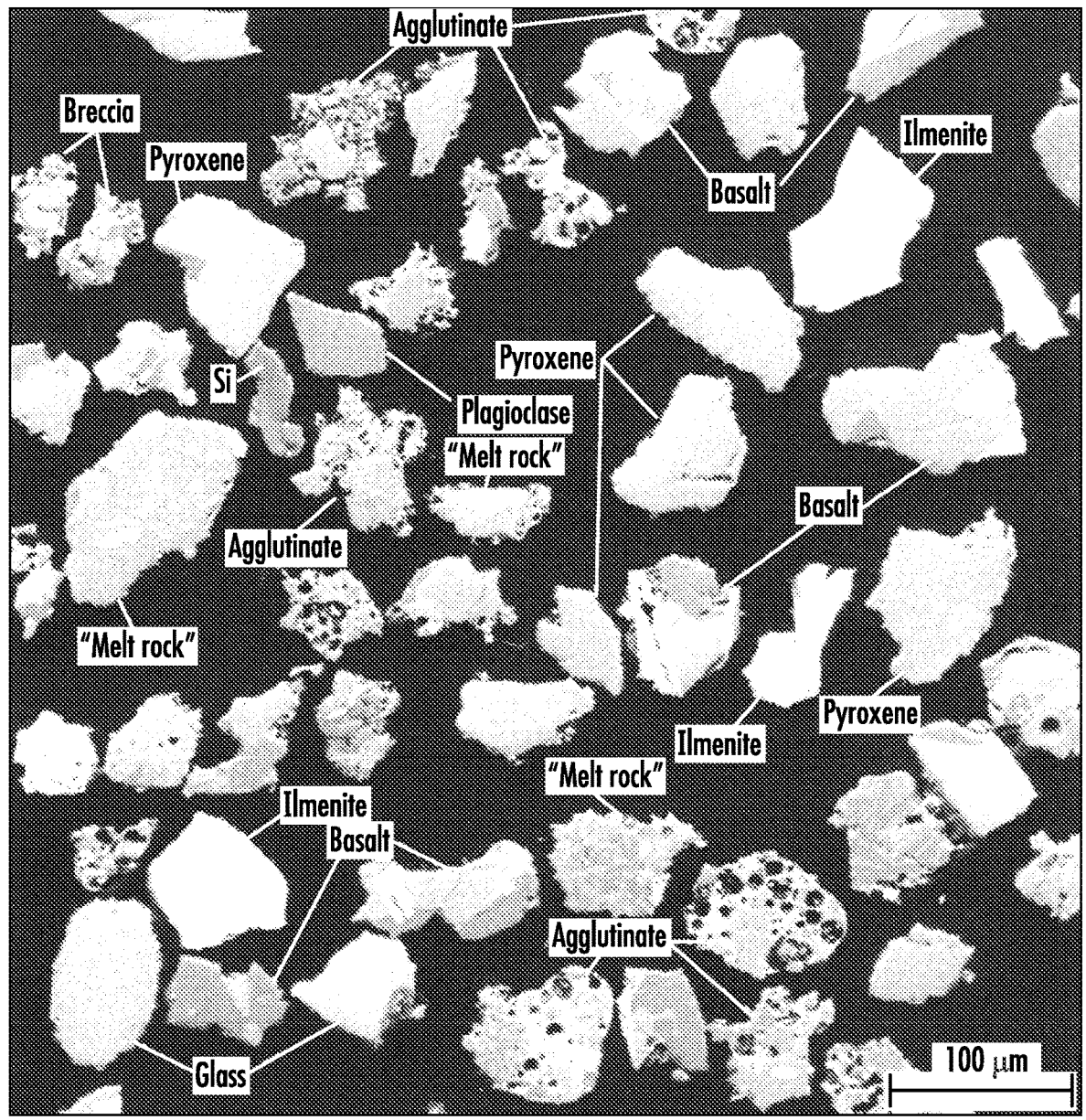
FIG. 1 is a micro image of lunar soil showing the different components or isolates that may be used to engineer a bulk building material using the system and method of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Lowering the power requirements of microwave sintering will produce economic benefit to a lunar exploration program. Constructing a landing pad may be the longest duration activity in setting up a lunar outpost. It has been determined that microwave sintering during that time may set a power requirement equal to the outpost's entire power supply, so other activities such as ISRU (in-situ resource utilization) may not be possible at the same time. As a result, this period may last a year. Reducing the power requirements by half may therefore recover months of usage-time for the hardware and power supply on the Moon. Since deploying a lunar outpost could ultimately cost on the order of $50 billion to $100 billion, and their useful life may be on the order of ten years before replacement, recovering just six months of time (5% of their life) by cutting the construction power requirement in half would have an economic value in the range of $2.5 billion to $5 billion. The more extensive the surface construction, the greater the economic value of an energy-saving innovation. For example, because of the high transportation cost to the Moon, any improvement of efficiency is highly leveraged, and since construction imposes high requirements on an outpost, the potential savings are enormous.

There have been some innovations in more efficient methods of converting electrical energy into microwaves. The other half of the equation has been neglected: the performance of the soil itself is an absorber of microwaves. On Earth, geomaterials including soil and gravel are used as building materials, but it is common to process and transport these materials from another location to obtain desired material properties rather than using the raw geomaterials already at any given construction site. A sand and gravel processing plant may be very large with multiple types of crushers, size sorters, conveyors, and hoppers plus a transportation fleet. Further, a mine often includes multiple beneficiation processes to remove the gangue minerals and other materials, and sort the materials based on composition, including magnetic, electrostatic, flotation, and other materials. On the Moon, aggregate processing should be simplified and sized to a scale appropriate for early lunar surface operations with minimal transportation. The added processes and hardware should be sufficiently simple and have a low mass to be repaid with significant, overall net savings.

The Moon contains a wide variety of building materials with different properties, but they are jumbled together as mixed particles. This is because the Moon's geology is dominated by impact processes, and these processes cause lateral mixing in the regolith. Every scoop of lunar soil contains particles of pure metal, glass beads, a variety of minerals with dramatically different properties, rock fragments, and agglutinates as shown in the micro-image of FIG. 1, showing examples of breccia, pyroxene, basalt, agglutinate, ilmenite, "melt rock," glass, and plagioclase. The key to obtain specialized building materials at a construction site is to sort the soil at the particle-scale to emphasize particles that have the desired properties.

Figure 2:
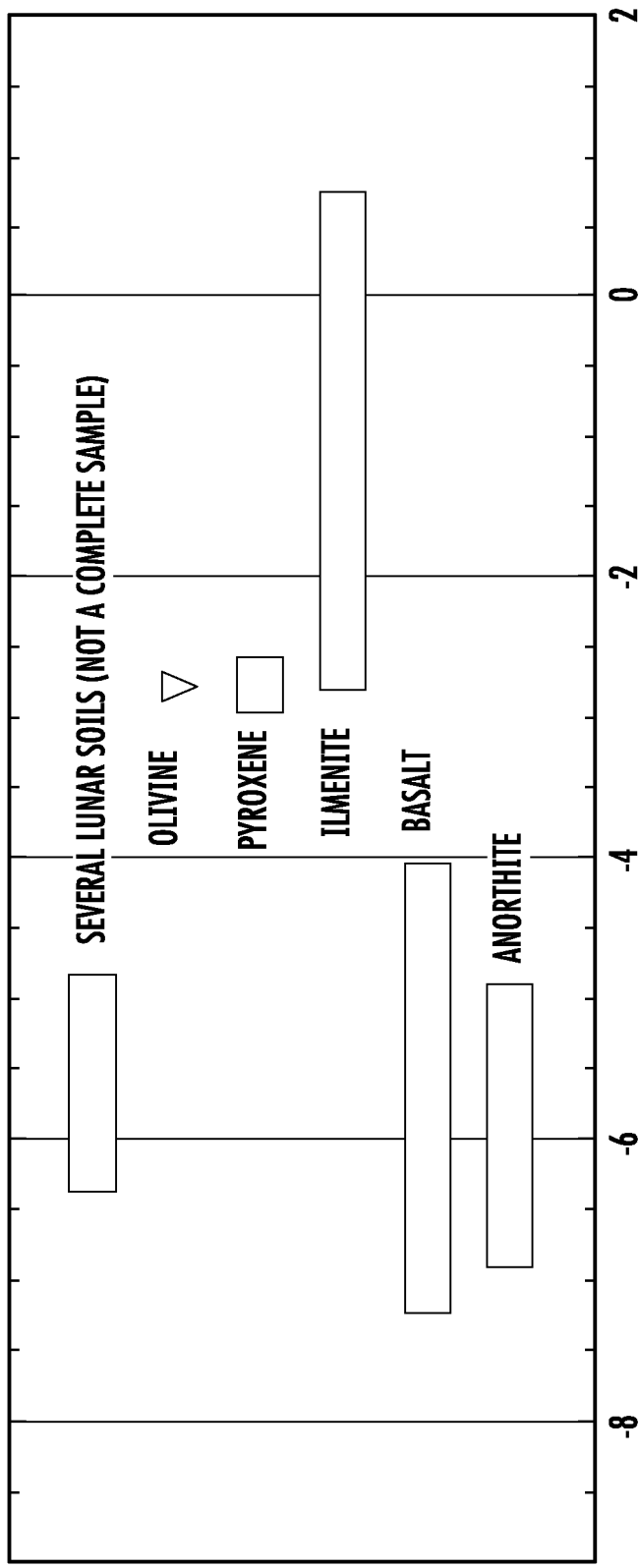
FIG. 2 is a chart showing the measured susceptibilities of several minerals commonly found in lunar soil.

When sintering particles, a goal is to sort the regolith such that microwave power may be delivered more precisely into the desired thickness of soil, but not below it. An object is to adjust thermal conductivity to keep heat in the sintering zone, and to create a mechanically strong sinter. In accordance with a non-limiting example, it is possible to leverage the magnetic properties of the typical mineral components of lunar soil. The bar chart of FIG. 2 shows that the typical mineral components of lunar soil vary in their magnetic susceptibilities by eight orders of magnitude and shows the range of several lunar soil samples. These variations in magnetic susceptibilities of the different mineral components of lunar soil provide an opportunity to engineer a better construction material on the Moon. This opportunity has not in the past been identified or leveraged.

The system and method, in accordance with a non-limiting example, magnetically beneficiates the soil to create a layered surface, then sinters the soil using antenna near-field energy absorbance. The soil layering using the magnetic beneficiation may include a highly microwave-susceptible, highly thermal-conductive top layer, on top of a poorly microwave-susceptible, poorly thermal-conductive sublayer. The antenna system may be optimized for magnetically dominant or electrically dominant reactive near fields as required for maximum absorbance in the beneficiated top layer.

The system may be configured to ensure microwave energy is maximally deposited into the upper, sintering region with minimal deposition below that layer, and that it is maximally retained in that region, rather than conducting deeper into the soil where temperatures do not reach sintering levels. The system may also incorporate multiple wavelengths corresponding to the changing absorbance of lunar soil as a function of temperature during the heating process. The entire system that performs excavating, beneficiating, laying and compacting layers, and sintering, may be packaged onto a single robot platform for single-pass construction of landing pads and roads, or these functions can be separated into distinct excavation, beneficiation, and construction machines for larger-scale efficiency in future operations.

Some technologies have been developed to beneficiate lunar regolith, including machines and systems that engage in size sorting, pneumatic sorting, electrostatic sorting, and magnetic sorting. These systems and machines had previously developed for an Aqua Factorem lunar ice mining system, which has been prototyped and tested, and is disclosed in commonly assigned U.S. patent application Ser. No. 17/177,277 filed on Feb. 17, 2021 by the same inventor, and published as U.S. Patent Publication No. 2021/0404338, the disclosure which is hereby incorporated by reference in its entirety. In tests using the system as disclosed in the '277 application, magnetic sorting has proven to have high throughput and to be simple, use low energy, and be highly reliable and effective. Based on these positive results, it is believed that magnetically beneficiating the soil will produce a magnetic isolate that has a much higher microwave susceptibility than ordinary lunar regolith.

Microwave susceptibility is a function of the electric and magnetic loss tangents, so a larger magnetic loss tangent generally increases with magnetic susceptibility. This hypothesis had been encouraged by recent results from NASA sintering experiments where nanophase iron in lunar soil did not produce much increase in microwave susceptibility, contrary to prior known teachings. This indicates that it is the loss tangent of the minerals themselves that dominate microwave absorption.

Figure 3:
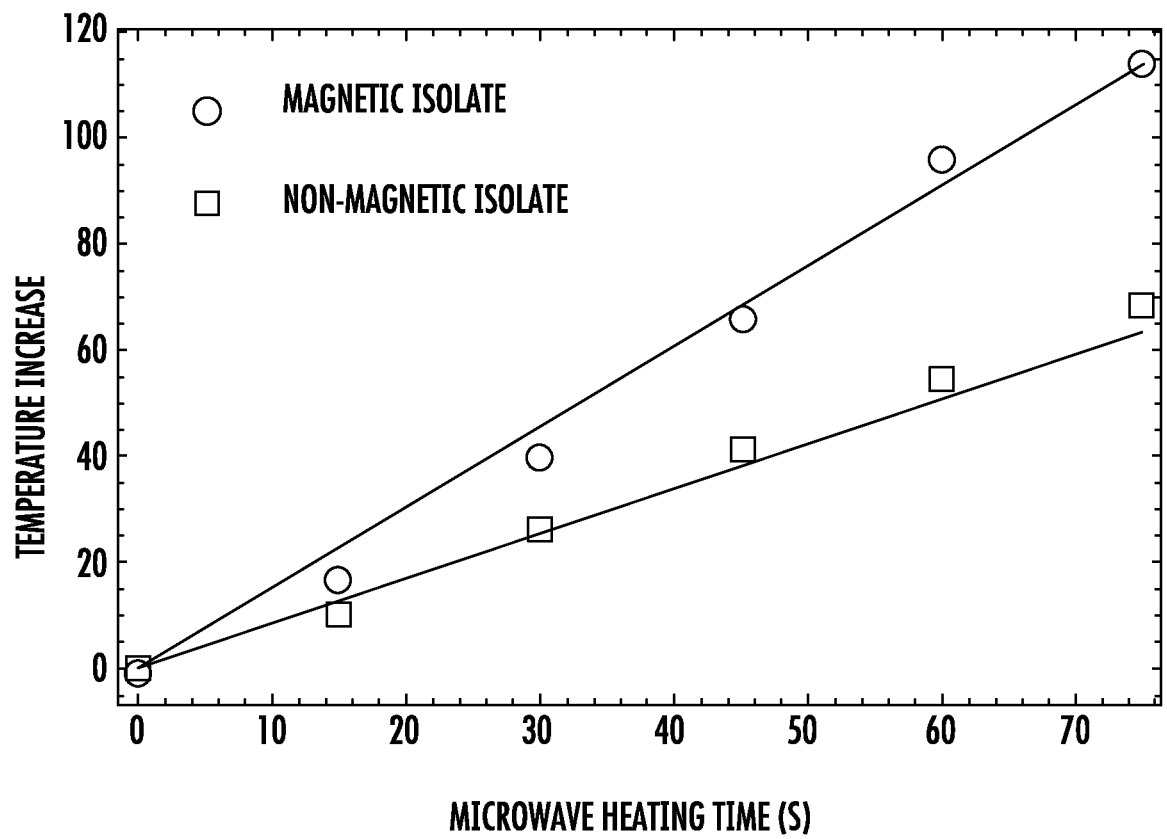
FIG. 3 is a graph showing the microwave heating time versus the temperature increase for magnetic soil isolates and non-magnetic soil isolates.

The Aqua Factorem magnetic beneficiator prototype as described in the incorporated by reference '277 application was used to split high fidelity mineralogical lunar soil simulant into high-magnetic and low-magnetic isolates. Highlands-type simulant from UCF's Exolith lab was used for these initial tests. The beneficiator's parameters were adjusted so that the magnetic isolate included about 66% weight of the simulant and the remainder was in the non-magnetic isolate, but it was adjustable for higher or lower magnetic cutoffs. Using equal mass/volume samples of the highly magnetic and non-magnetic samples in identical microwaving conditions, the temperature increase of each was measured and is shown in the graph of FIG. 3.

The magnetic isolate in this test heated 79.7% faster ($R^2=0.997$) than the non-magnetic isolate. Furthermore, the heat capacity of the two isolates was measured and found that the magnetic isolate had 26.5% lower heat capacity, so it will reach sintering temperatures with even less energy, while the non-magnetic sublayer will stay at lower temperatures for a given amount of energy.

Since thermal conductivity of lunar soil has a dominant radiative term that varies as a temperature cubed ($T^3$), the cooler sublayer will act as an effective insulator to keep the thermal energy in the sintering zone. Furthermore, the sublayer can be laid down with less compaction than the overlying layer. This may be facilitated by the system because when a roller compacts a layer of soil more than a centimeter thick, it will not significantly compact the underlying layers, which is why roads may have a required maximum "lift" of about 1 centimeter during construction. Maintaining the underlying layer less compacted will also contribute to making that underlying layer a better insulator to help keep the thermal energy in the sintering zone. These beneficial results should be even better obtained with real lunar soil that contains large quantities of glass plus extremely susceptible meteoritic metal particles, since the wider range of magnetic/microwave susceptibilities on the particle scale will result in an even greater difference in the bulk properties after beneficiation.

Figure 4A:
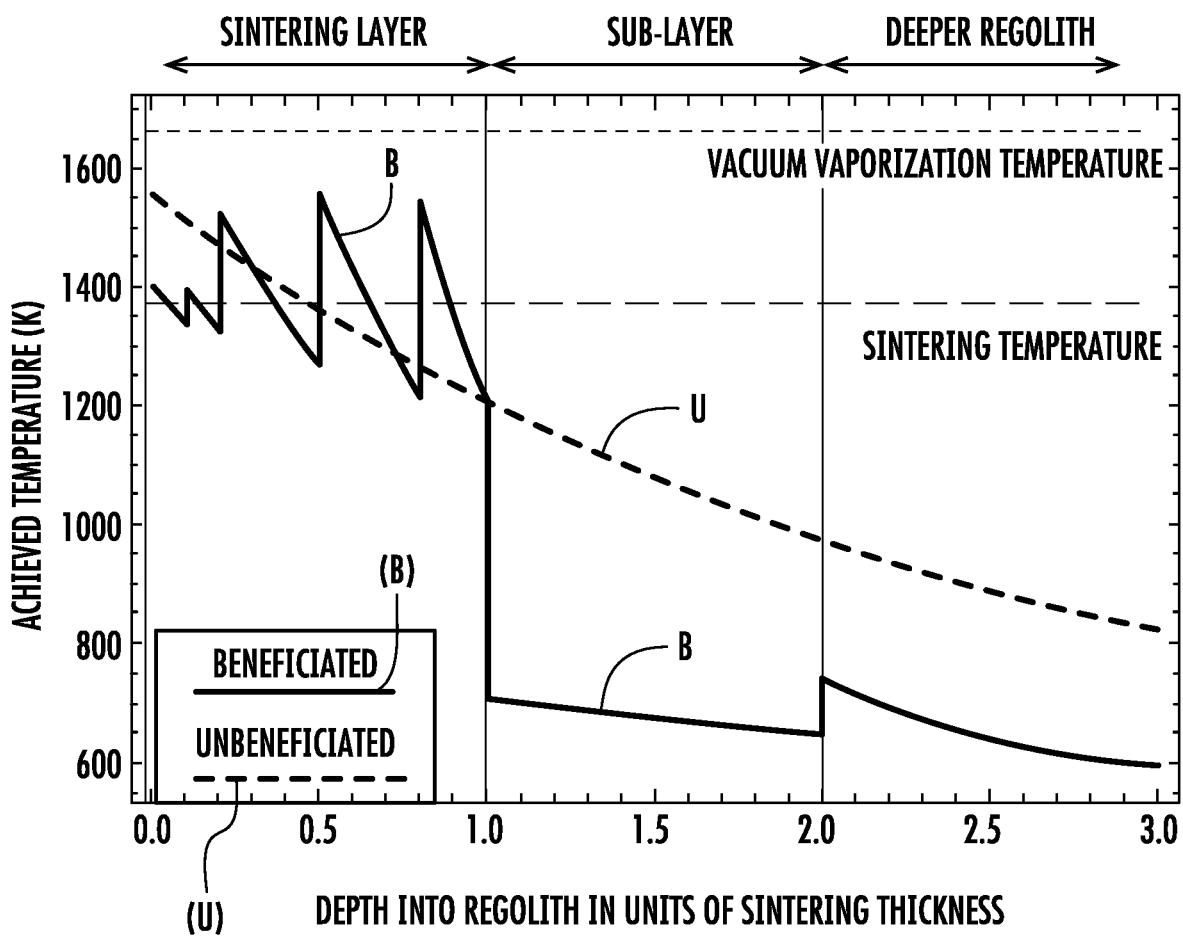
FIGS. 4A and 4B are graphs showing the depth into regolith in units of sintering thickness versus achieved temperature in FIG. 4A and thermal conductivity in FIG. 4B.
Figure 4B:
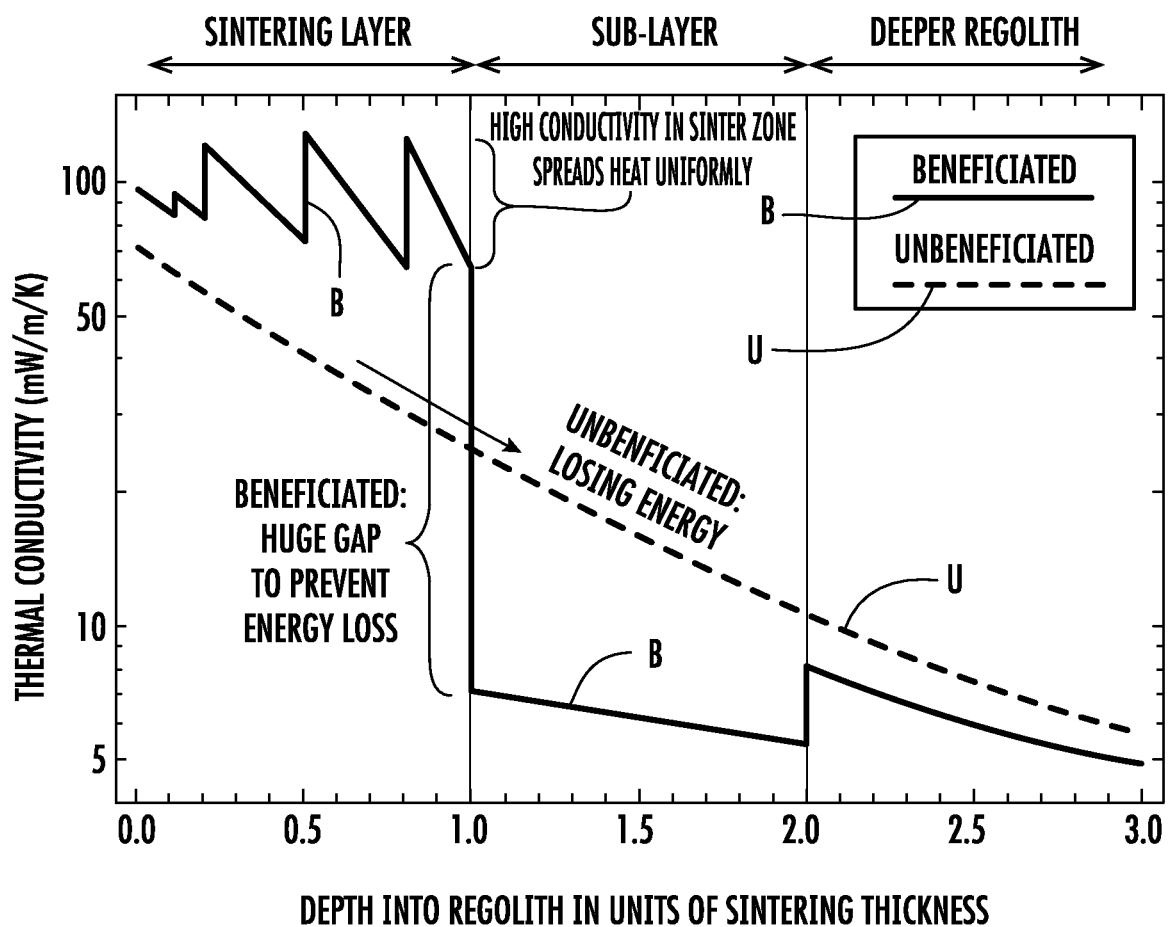

The graphs of FIGS. 4A and 4B show the results of preliminary modeling and simulation of microwave absorption based on laboratory data.

Both graphs in FIGS. 4A and 4B show along the horizontal axis the depth into regolith in units of sintering thickness. FIG. 4A shows along the vertical axis the achieved temperature assuming no thermal diffusion, and in FIG. 4B, the thermal conductivities on the vertical axis. In FIGS. 4A and 4B, both the sintering layer, sub-layer and deeper regolith are illustrated along the horizontal axis with the illustrated depth into regolith in unit of sintering thickness. The beneficiated soil results are shown by the solid line at A and the unbeneficiated soil by the line at B in both FIGS. 4A and 4B. The vacuum vaporization temperature is illustrated in FIG. 4A relative to the sintering temperature. The beneficiated soil has a huge gap to prevent energy loss as shown in FIG. 4B and shows the reduction in FIG. 4A. The high conductivity in the sinter zone spreads the heat uniformly as shown by the beneficiated zigzag lines in the sintering layer in FIG. 4B.

In this example, a microwave generator may be configured to generate microwave energy to achieve a temperature in the microwave susceptible, thermal conductive top layer of lunar soil of about 1,200° K to about 1,600° K (about 900° C. to about 1,330° C.), and achieve a thermal conductivity of about 70 to about 110 mW/m/K.

The lunar soil may be beneficiated and remixed into four grades of susceptibility plus an unmodified grade. The lunar soil may be laid in five top layers and one sublayer to maintain the sintering temperature nearly constant in the sintering zone and lower in the sublayer as may be reflected in the graphs of FIGS. 4A and 4B. This deposits 71% of the energy into the sintering zone in this example. As a comparison, using unmodified regolith requires a longer wavelength, e.g., longer penetration depth, to achieve a similar range of temperatures in the sintering zone to achieve sintering while avoiding overheating, excessive melting, and possible vaporization. Only about 35% of the energy is deposited in the sintering zone and about 92% longer duration of power is required to achieve sintering temperatures. The beneficiated case requires $[1-(1/1.92)]=48\%$ less energy without even taking the better thermal conductivity into account. The beneficiated case has much lower temperatures than the sublayer, thus, the thermal conductivity in the top layer is 7.9 times higher than in the sublayer, while also taking into account the targeted compactions.

Therefore, accounting for thermal diffusion during the sintering process, use of the beneficiated soil will cut the energy required by well over half. This will reduce construction time by half, recouping half of the time-value of the power systems delivered to the Moon. For a construction time of a year or more, considering that the cost of lunar assets may be in the $10 billion to $100 billion range with a lifespan of about 20 years, the system may recoup $1 billion or more in the real value of those assets. This system will produce a better sinter since the temperature will be more uniform in the sintering zone all the way to its lower boundary.

The system addresses the challenge of lunar dust that has high magnetic susceptibility caused by the abundance of the nanophase of iron (npFe) in the fines fraction. Combining two beneficiation processes may enable the system to separate out the dust fraction first before beneficiating the coarse fraction into high and low susceptibility isolates. The system may determine by experiment and analysis whether it is better to recombine the fines fraction back into the high susceptibility coarse fraction or the low susceptibility coarse fraction prior to microwaving, or whether to separately beneficiate the dust fraction into higher and lower susceptibility dust isolates before recombining appropriately with other isolates. These possible techniques are disclosed in the flowcharts of FIGS. 5A to 5C.

Figure 5A:
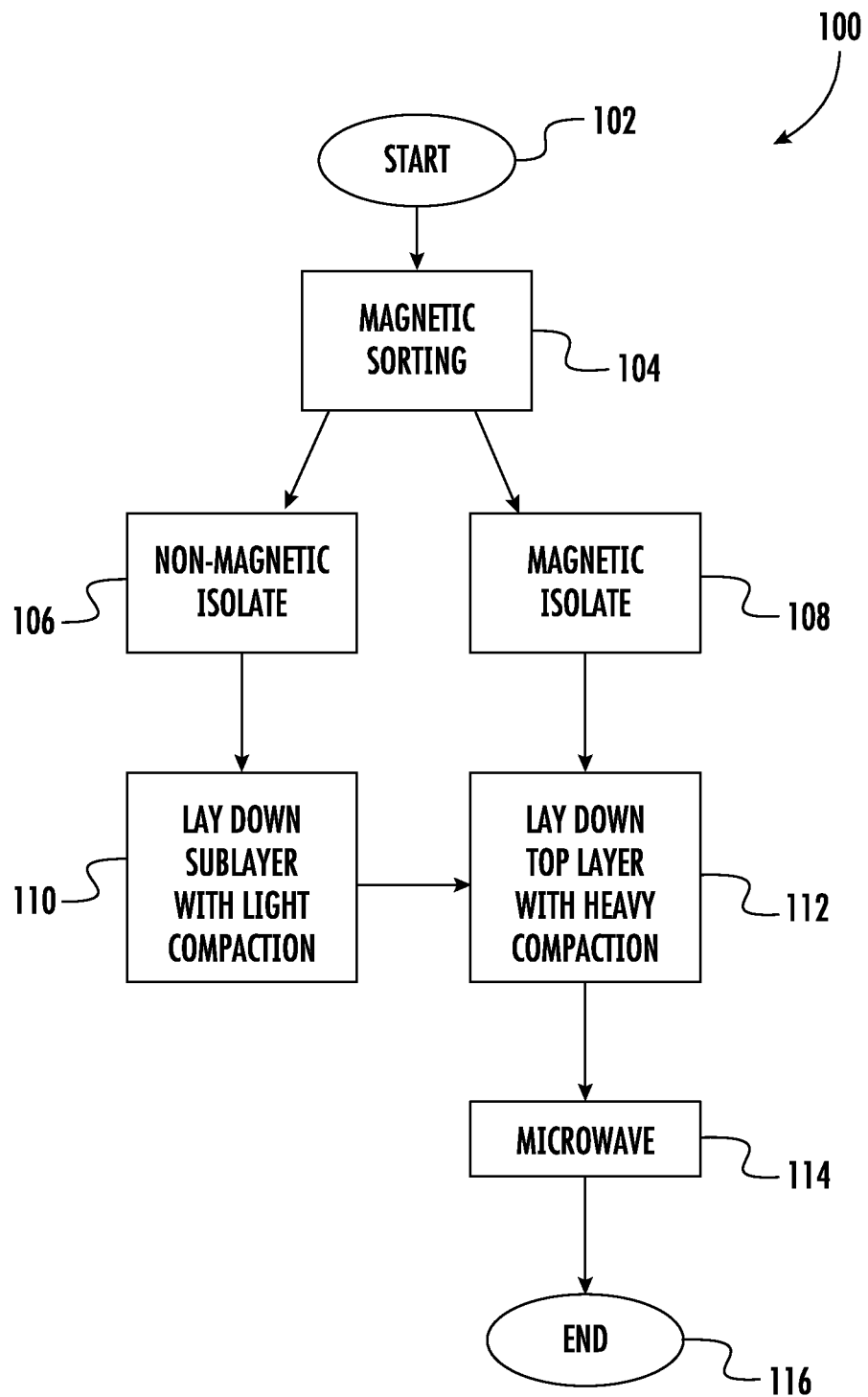
FIGS. 5A through 5C are flowcharts showing different methods of constructing the building material from soil, such as lunar soil.

A first technique is shown in the flowchart of FIG. 5A and illustrated generally at 100. The process starts (Block 102) and magnetic sorting of the lunar soil occurs (Block 104). This magnetic sorting provides a non-magnetic isolate (Block 106) and a magnetic isolate (Block 108). Using the non-magnetic isolate, the sublayer is laid down with light compaction (Block 110) followed by laying down the top layer with heavy compaction (Block 112). Microwave energy is applied to the top layer (Block 114) to form the final construction material and the process ends (Block 116).

Figure 5B:
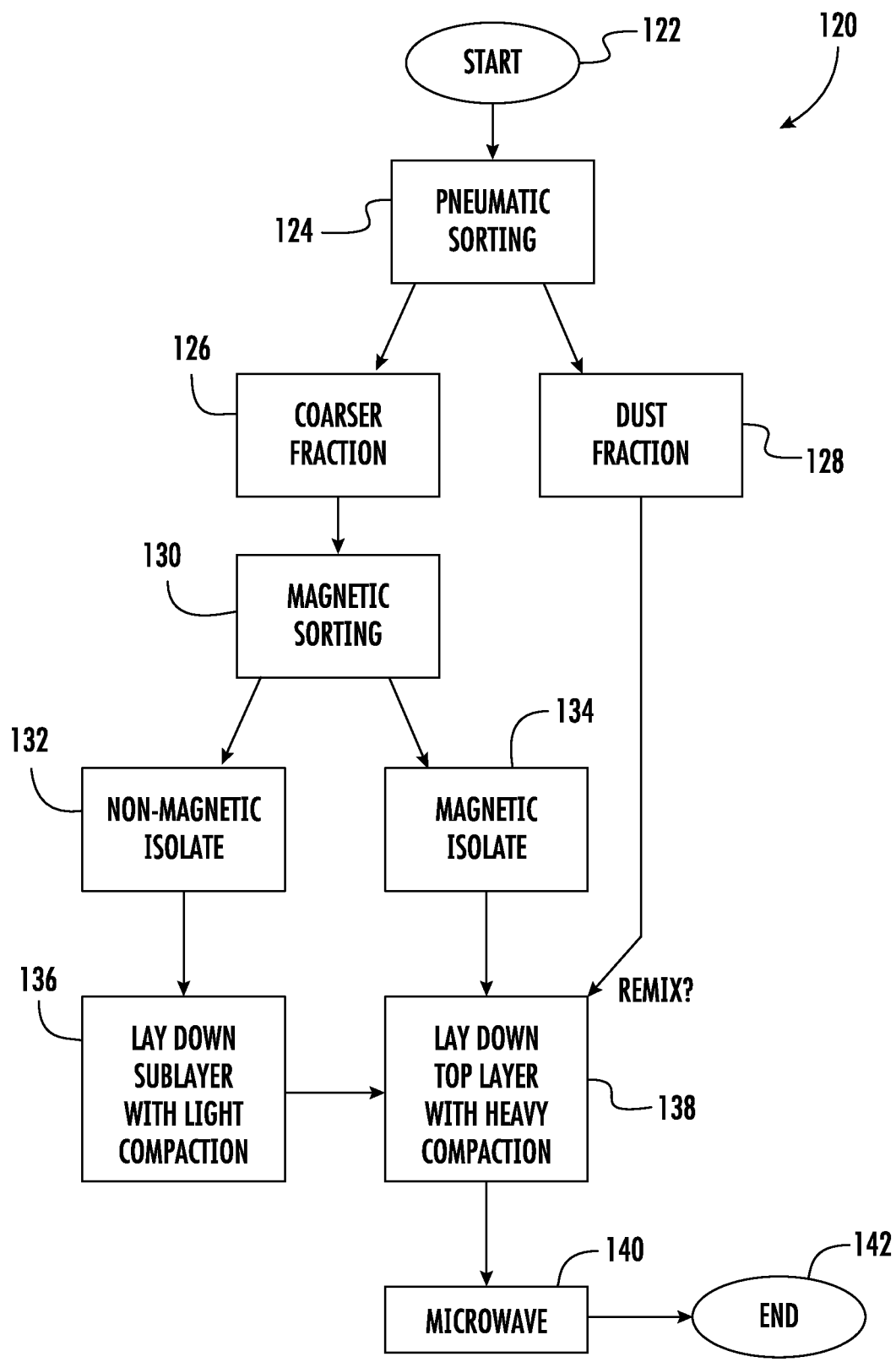

A second technique is illustrated in FIG. 5B as shown generally at 120. The process starts (Block 122) with pneumatic sorting (Block 124). The pneumatic sorting, such as using a device described in the incorporated by reference '277 application, provides a coarser fraction (Block 126) and a dust fraction (Block 128). Magnetic sorting occurs with the coarser fraction (Block 130) to form a non-magnetic isolate (Block 132) and a magnetic isolate (Block 134). A sublayer is laid down with light compaction (Block 136), which is followed by laying down the top layer with heavy compaction (Block 138). At this step, the dust fraction may be remixed with the top layer and the heavy compaction. Microwaving occurs (Block 140) and the process ends (Block 142).

Figure 5C:
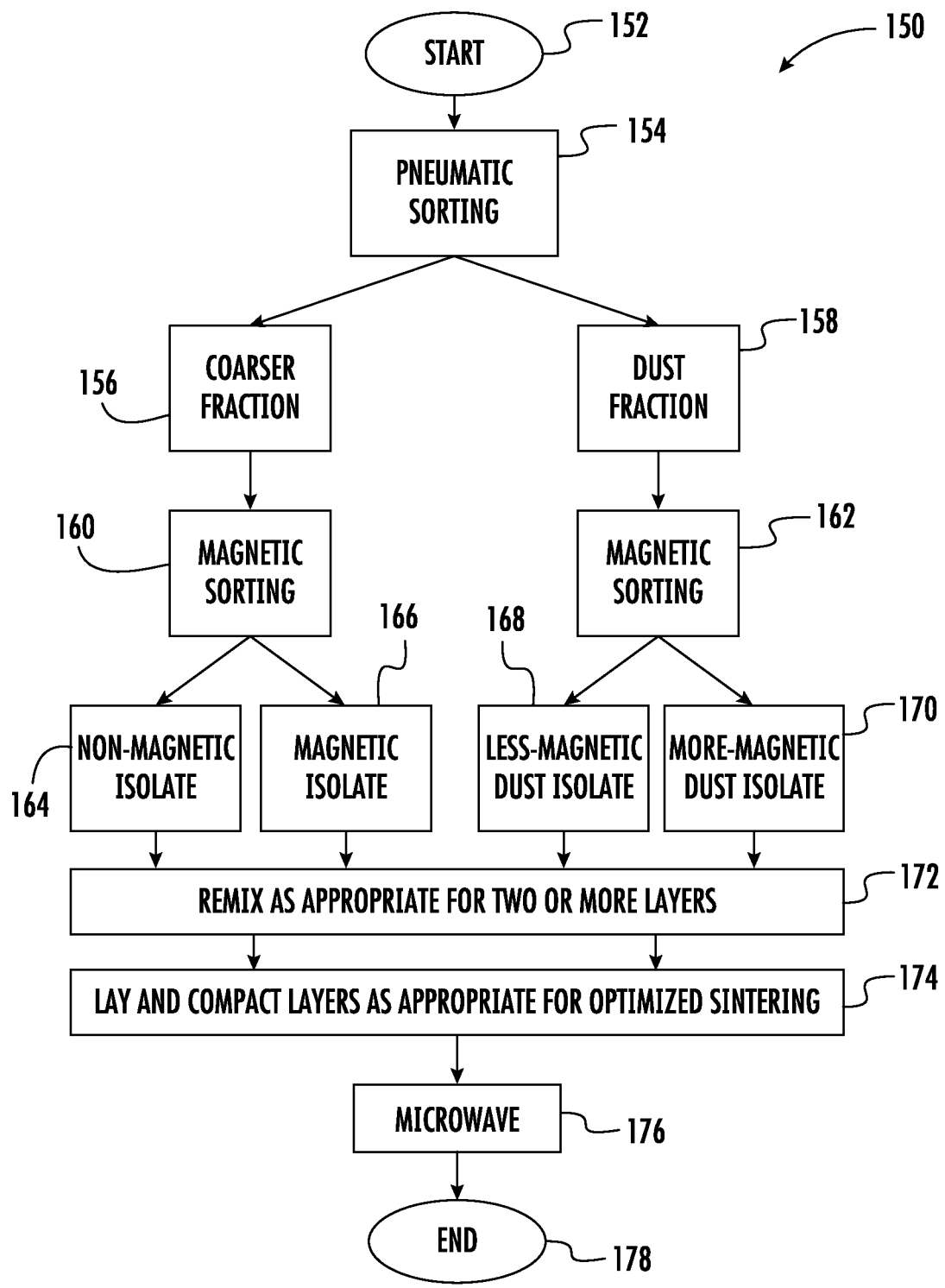

Referring now to FIG. 5C, a third technique is illustrated generally at 150. The process starts (Block 152) with pneumatic sorting (Block 154), which forms a coarser fraction (Block 156) and a dust fraction (Block 158). The coarser fraction is magnetically sorted (Block 160) and the dust fraction is magnetically sorted (Block 162). The coarser fraction after magnetic sorting forms a non-magnetic isolate (Block 164) and a magnetic isolate (Block 166). After magnetic sorting the dust fraction, a less-magnetic dust isolate is formed (Block 168) and a more-magnetic dust isolate is formed (Block 170). A remix occurs as appropriate for two or more layers (Block 172), such as mixing magnetic components together and mixing non-magnetic components together, and layers are laid and compacted as appropriate for optimized sintering (Block 174). Microwaving occurs (Block 176) and the process ends (Block 178). In one aspect, the top layer of the lunar soil may be formed as a plurality of layers of lunar soil with varying microwave susceptibility in order to improve or optimize or enhance the efficacy and/or effectiveness of the microwave sintering. Multiple layers of predesigned susceptibility may be incorporated, and more than two binary layers may improve the sintering. The layers could be of different thicknesses and include multiple thinner layers of varying microwave susceptibility. The top layer of the multiple layers could be the most microwave susceptible, or middle or lower layers depending on the end use and design considerations could be more microwave susceptible. The different layers and thicknesses may depend on the end-use applications and the materials contained in each layer.

NASA has performed tests of sintering with npFe and discovered that the nanophase iron contributes little to microwave susceptibility. The nanophase iron particles are tiny compared to the wavelength and are usually contained in insulating glass in the soil particle's patina. The primary effect of npFe is therefor to increase magnetic susceptibility, since it is superparamagnetic. It is known that npFe as nanophase iron particles is found predominantly in the finest size fraction of the lunar soil since that has the majority of surface area. The fines or dust fraction was found to include much more glass than the coarse fraction so the particles having less than one micron range may be up to 70% glass.

This fines or dust fraction may be separated from the coarser fraction by pneumatic sorting as shown in FIGS. 5B and 5C. Afterward, magnetic sorting may be performed on the larger size fraction soil (FIG. 5B). It is possible to recombine the fines or dust fraction back into the beneficiated coarse isolates as based on a combination of benefits/harms to microwave susceptibility and thermal conductivity.

Thermal conductivity is higher with a broad particle size distribution since that creates more grain contacts per volume than the narrow-size range, coarser fraction alone. However, the benefit may be diminished at higher temperatures where radiation inside the pore spaces dominates the heat transport.

Equations have been developed based on experiments that accurately describe the dependence of thermal conductivity on porosity, so it is easy to determine how the soil will conduct heat with or without the fines fraction returned. An example is disclosed in Metzger et al., "Thermal Excitation of Volatiles from Lunar and Asteroid Regolith and Axisymmetric Crank-Nicolson Modeling," Journal of Aerospace Engineering 33, No. 6 (2020): 04020075, the disclosure which is hereby incorporated by reference in its entirety.

It is possible that remixing them into the soil may either help or hurt microwave sintering. For example, mixing may help by diffusing the heat more uniformly at the grain-scale, helping to avoid runaway melting and uniform mechanical consistency of the sintered product. It may hurt by helping conduct heat away from the sintering zone, wasting energy. A decision may be based on integrated modeling.

One prior technique performed in lunar sintering but without beneficiation to enhance it and another prior technique performed sintering, but used an additive as a susceptor to enhance microwave susceptibility. These techniques and especially the additive may create more susceptible soil, but not less susceptible soil for the insulating sublayer. Natural lunar soil already has natural susceptors as high susceptibility particles such as ilmenite and metal grains, which the lunar simulant used in the prior technique of the additive did not have. The current system as described may concentrate those natural susceptors through beneficiation and eliminate the need to bring additives from Earth. There have been some previous studies of multi-wavelength, e.g., use of infrared and microwaves, for heating the lunar soil. By using the longer wavelength while the soil is cold, and then switching to the shorter wavelength when the soil was hotter, the process of heating the soil became much more efficient. However, the current system beneficiates the lunar soil to make a better construction material, which these previously described techniques did not encompass.

Preliminary testing has demonstrated the benefit of magnetically sorting the regolith prior to sintering. This may be quantified for real lunar soil and modeled, first to optimize the system parameters and top level design, and second to project the architectural benefits to the system including mass and cost savings and increase in construction speed. These results may give entities such as NASA the data it requires for funding and enable NASA to decide on incorporating the system into future lunar operations. To do this, a model may be developed and a series of experiments performed using simulants having high fidelity mixtures of simulants representing both highlands and mare type soils. The system may incorporate realistic glass content representing a wide variation of soil maturities with emphasis on the most commonly represented types of soils as determined by the Apollo program.

The experiments may determine the correlation between composition, particle size distribution, magnetic susceptibility, and microwave susceptibility. One challenge may be dealing with the absence of nanophase iron particles (npFe), which are very difficult and expensive to replicate in simulants. Ideally, it is possible to use actual lunar soil in these tests. Simulants may be used to learn from their use before organizations, such as the CAPTEM (Creation and Analysis Planning Team for Extraterrestrial Materials), may consider a request for actual lunar soil. Preliminary tests may be accomplished and a request for actual lunar soil may be later made and initial tests may be designed to buy down the risk adequately.

It is possible in initial testing to use an off-the-shelf microwave oven at this stage, which may be calibrated by using a variety of materials, including water and granular solids of known susceptibility to determine time-averaged microwave power at various elevations and radial positions on the turntable. The simulant mixtures may be microwaved and the temperature measured at selected locations in the material at selected time steps through the process. From these measurements, the microwave susceptibility as a function of temperature may be calculated for each mixture. It is possible to determine what magnetic susceptibility to use as the split-limit for the magnetic isolates. The magnetic beneficiating system, previously developed for the Aqua Factorem lunar ice mining system as disclosed in the incorporated by reference, copending '277 patent application may be tuned to split the simulant samples at that susceptibility.

The model may be a mixing model based on known magnetic and microwave susceptibility of minerals and glass. It is possible to calculate the net absorption due to a realistic assemblage of mineral and glass particles. Microwave absorption is a function of temperature, and some minerals will heat faster than others, and it is possible to compare the rate of heating with the rate of heat diffusion in the soil to even out the temperatures. The heat diffusion may be per a detailed model as described in Metzger et al. above.

The heterogeneity of individual grain temperatures, accounting for real-time heat diffusion, may be accounted for in calculating the net microwave susceptibility as a function of average temperature of the soil. This model may be validated and iterated in comparison to the measurements described above. Parameters for the uncertainties such as particle shapes, chemical uncertainties, and grain-scale heat conduction may be tuned to achieve agreement, and any remaining disagreement may be investigated. Obtaining agreement between experiments and modeling may provide confidence that the microwave susceptibility of different compositions and different size fractions, including dust with npFe and coarser fractions with less npFe, is well understood.

These results may be compared to and extrapolated to real lunar soil by analysis based on their known mineralogy, glass content, and size distributions. This may determine the optimum splitting process for the various real lunar soils. Some Apollo soils would likely require a different magnetic split than others, and it is possible to determine the breadth of the variation in optimized splits. This will determine how to design the flight hardware so it can adjust in real-time to any lunar soil.

Based on these results, the system may include a pneumatic plus magnetic separation process that maximizes microwave susceptibility. The ideal beneficiation may optimize the overall construction process, not just magnetic susceptibility, so further modeling may be performed. It is possible to adapt the Crank-Nicolson finite difference model of thermal conductivity and heat capacity for lunar soil as explained in Metzger et al. The modified version may take into account the differences in lunar soil composition, particle size distribution, and the results of the beneficiation process. It is possible to incorporate the microwave susceptibility as a function of soil parameters and use a standard microwave antenna energy deposition pattern. This may predict how heat deposits and spreads through the lunar soil during the sintering process with resolution at the 0.1 millimeter-scale to a depth of 3 meters below the sinter.

It is possible to run cases using standard, unmodified lunar soils and also run cases where beneficiated soil has been deposited and compacted onto the surface to build a landing pad. The model may predict how much energy will be deposited into the sintering layer and how much will be wasted by propagating into deeper layers where the temperature never gets hot enough for sintering to occur. It is also possible to predict how much energy propagates away from the sintering layer during the process and is wasted. This may be repeated for different microwave power levels and different beneficiation cases both with and without the fines re-mixed into the soil. It is also possible to evaluate adding a gravel layer or course layer under the sintering layer as insulation to minimize thermal conductivity out of the sintering zone. Heterogeneities may be added into the soil to produce situations of localized runaway melting to test the limits when this occurs and how to avoid it.

The system may include a rover that excavates and beneficiates or brings soil to a standalone beneficiator, such as an example rover in the incorporated by reference '277 application. It is possible to obtain Lunar Highlands Simulant and Lunar Mare Simulant, and obtain samples of the individual mineral components of those simulants in crushed form. Volcanic glass and other composition glass may represent lunar soil glass. Metal powders may be obtained and passivated for safe use in an oxygen environment by oxidizing a rind on the powders in oxygenated tap water before mixing in the simulants. For example, a technique developed and innovated by Dr. Jackie Quinn of NASA/KSC may be employed. The metal powders may simulate the metal meteoritic material in lunar soil and may contribute to the fines fraction representing lunar dust with high magnetic susceptibility due to npFe. Another technique that may be employed was innovated by Dr. Quinn and performed at NASA/KSC for lunar simulants. These materials may be mixed to represent pre-beneficiated lunar soils.

It is possible to construct a beneficiating mechanism similar to that system previously built for Aqua Factorem and disclosed in the incorporated by reference '277 application, but include a pneumatic separator. It is possible to perform experiments beneficiating these materials and examining the products with optical microscopes to identify how beneficiating affects the mixture compositions at the particle scale. Candidate mixtures may be selected for the next task.

The magnetic and microwave susceptibility and thermal properties of the selected pre- and post-beneficiated samples may be characterized. For heat capacity, the samples may be mixed with water of known mass and temperature and the equilibration temperature measured. For microwave susceptibility, it is possible to quantify the microwave power density of a commercial oven as a function of location on and above the turntable using standard absorbers and measuring their temperature over time. The temperature rise of the selected samples may be measured and the heat capacity used to calculate the microwave susceptibility. The magnetic susceptibility may be measured using a Faraday Scale, such as a system built for the Exolith Lab, which was used in measuring asteroid simulant susceptibilities. The different characteristics may be compared for each material to identify correlations in their properties.

A volumetric mixing model may be used to analytically combine each constituent material's properties as specific heat, magnetic susceptibility, and microwave susceptibility, and compare them with the measured values of the bulk mixtures. Microwave susceptibility may be treated as a function of temperature. The volumetric mixing model may be modified as necessary to account for some minerals heating faster than others and energy diffusing through the bulk sample. This may produce a more advanced mixing model that will be useful in more advanced modeling. This has been validated for a finite different model using Crank-Nicholson formalism for heat diffusion in lunar soil. That model may be modified by adding the microwave susceptibility property and absorption of microwave energy from a plane wave impinging the surface. The Beer-Lambert Law may be used to model the decay of microwave power density as a function of depth in the material and deposition of thermal energy in the soil. Different parameters may be used for the soil layers with the different versions of beneficiated soil. The parameters of the layers may be adjusted to optimize deposition and retention of thermal energy in the desired sintering thickness.

Based on these results, the system may include a rover with an excavator that feeds lunar soil into the beneficiation subsystem, such as described in the incorporated by reference '277 application. That subsystem may create multiple material streams that may be successively laid down and compacted as sublayer(s) and a top layer. A roller or other mechanism may impart compaction. A sintering subsystem may apply microwaves to sinter the soil. The option to use multiple wavelengths includes near-field magnetic or electric reactive fields to concentrate deposited energy into the upper layers.

An architectural analysis of the construction system's mass, power requirements, construction speed, power system mass, and cost may be used to predict savings and benefits of the system. It may be based upon the realistic measured data so that NASA or other organizations may make an informed decision about the benefits of creating engineered construction materials from lunar soil through beneficiation processes.

A pneumatic, ballistic separator, such as described in the '277 application, may include mechanical sorters that include different sets of paddles, which may be 60° to 100° out-of-phase from an adjacent paddle to provide agitation of the material stream on top of a deck. In an example, the system may include a rotor that has impellers that fling material in the air and separate a lighter, regolith powder section from a heavier regolith powder section. A grinder may include different grinding wheels or blades that receive and grind regolith into a ground regolith powder. A magnetic separator may also include an eddy current separator device and a rare earth magnetic separator device. The system may include a beneficiation subsystem that may require low energy and reduced power infrastructure, resulting in much lower start-up cost. It is feasible for the system to be set up on just one lunar landing and carried in one lunar module.

Beneficiation has been used in terrestrial mining as an intermediate step between extraction and chemical processing, while magnetic or density approaches have been used to concentrate resources. The system may apply different processing techniques and combinations of different methods may concentrate useful minerals.

Gas flow enclosed in pipes may lift and accelerate individual particles and separate them ballistically or centrifugally. This type of process may use the same principle as winnowing: separation of particles may be determined by the ratio of inertial force and aerodynamic drag force, which is called the ballistic coefficient. Inertial force scales as density $\rho$ times diameter cubed, $pd^3$. Aerodynamic drag force at low gas velocities may scale as particle surface area, or $d^2$.

Magnetic separation of the finest dust from other particles is possible because it is the fraction with maximized concentration of NpFe, so this dust can be provided to other processes that use microwave techniques. Dust may be mixed into quantities of raw lunar regolith to enhance microwave susceptibility and reduce energy when handling mature soils.

In an example, at least one of the magnetic separators may include a first magnetic coil configured to separate strong magnetic particles using a magnetic field of about 400 to 600 gauss, and a second magnetic coil configured to separate paramagnetic particles at a higher intensity magnetic field of about 6,000 to 20,000 gauss. It is possible to use permanent magnets, which require much lower power.

The pneumatic separator numeral may be formed as a cyclone separator that includes a series of cyclones of decreasing diameter. Each sized cyclone may separate out all particles above a certain ballistic coefficient, while the finer or lighter particles may continue with the gas flow and exit the top. This exited gas may go into the next smaller cyclone, which separates the next smaller/lighter particles. This may be performed with a series of as many cyclones, but the system may separate the flow into three streams as shown with pneumatic separator or could be four or more streams. An example is a conical reverse-flow cyclone separator that may include a double vortex inside the cyclone. Smaller particles follow the gas out the top, which can be fed into the next smaller cyclone. Multiple stages may create separate particle streams.

Other techniques may be used for pneumatic size separation. It is possible to blow particles with gas up a pipe. The coarser particles do not go as fast as they fall down a side-pipe after only a short distance. The next smaller sized particles go faster and travel uphill farther and fall down the next side-pipe. The next finer particle sizes go even faster and farther uphill and fall down the next side-pipe. Other techniques may be used. Some techniques are insensitive to inertial motions of the rover and a cyclone method may be more robust for that purpose.

It should also be understood that a spiral separator may be used, which is also termed a spiral chute. Traditional sieving screens may not work as well in low gravity because the soil does not flow through the small holes. A spiral separator, however, may separate solid components based on a solid particle density and a particle's hydrodynamic properties such as drag. Other techniques may be used.

Figure 6:
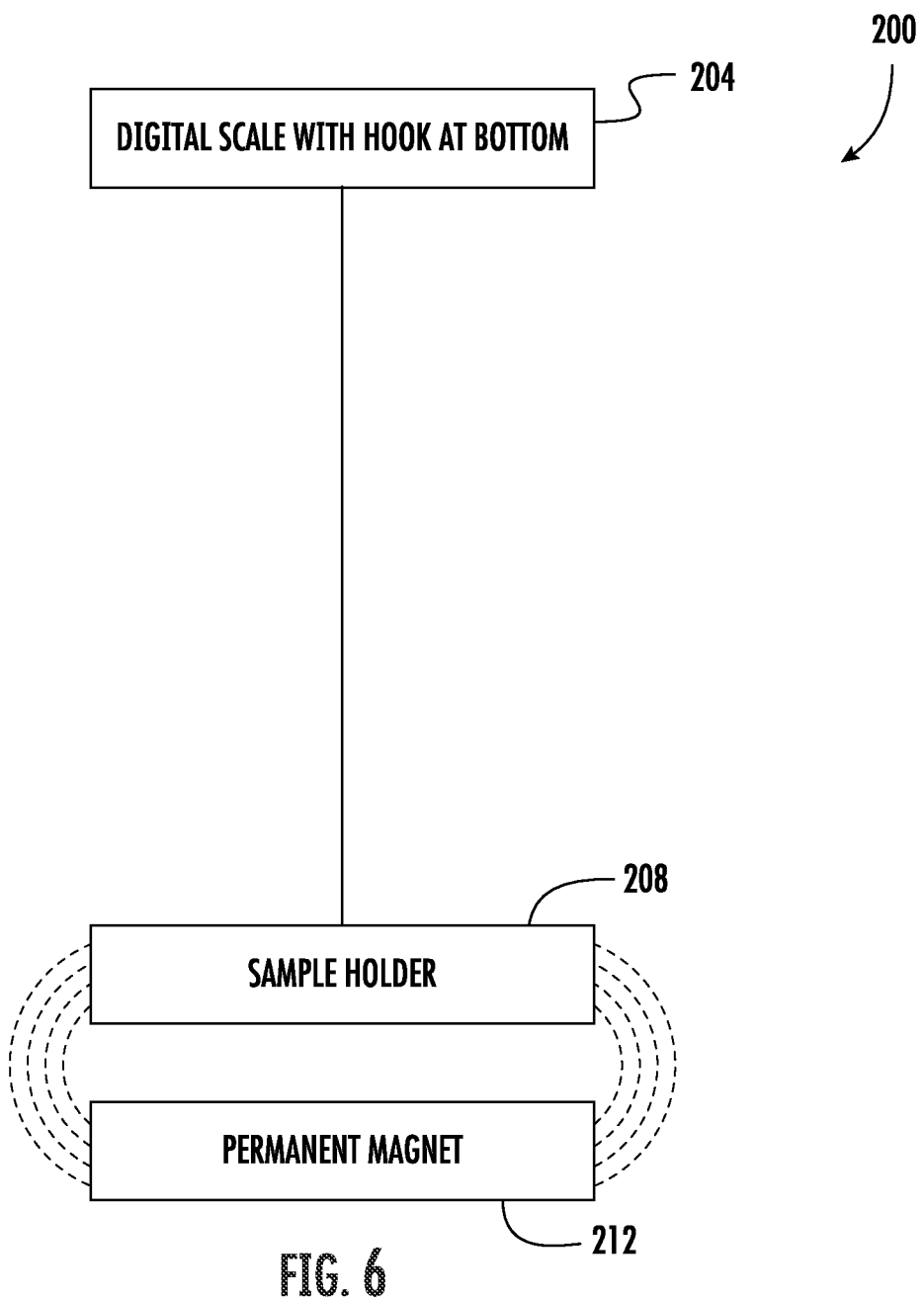
FIG. 6 is a schematic block diagram of a Faraday scale that may be used to measure magnetic susceptibilities of individual components in simulants.

Data has been obtained regarding the susceptibility and sintering of lunar regolith, which includes magnetic susceptibilities. As noted before, there is a distinct magnetic susceptibility on lunar regolith simulants with beneficiation. In this experiment, the simulants were obtained from University of Central Florida (UCF) Exolith Lab. The lunar mare simulant (LMS1) and lunar highland simulant (LHS1) were used. The lunar mare simulant had up to 80% of magnetic minerals, whereas the lunar highland simulants had about 65% of magnetic minerals. The magnetic susceptibilities of individual components in simulants were measured as shown in the block diagram set-up of FIG. 6 by using a Faraday scale illustrated generally at 200, and showing a digital scale 204 with a hook at the bottom and a sample holder 208 and positioned adjacent thereto a permanent magnet 212.

Iron (III) chloride hexahydrate ($FeCl_3.6H_2O$) and Nickel chloride (II) hexahydrate ($NiCl_2.6H_2O$) with molar susceptibilities $(X_m/10^{-6} \text{ cm}^3 \text{ mol}^{-1})+15250$ and +4240, respectively, were used as reference materials. The difference in force on and off the magnet on the equal volumes of samples and reference materials were measured, which then allowed the calculation of the susceptibilities of the samples. The measurements using $NiCl_2.6H_2O$ produced a small difference in force, and hence, were excluded from analysis.

Figure 8:
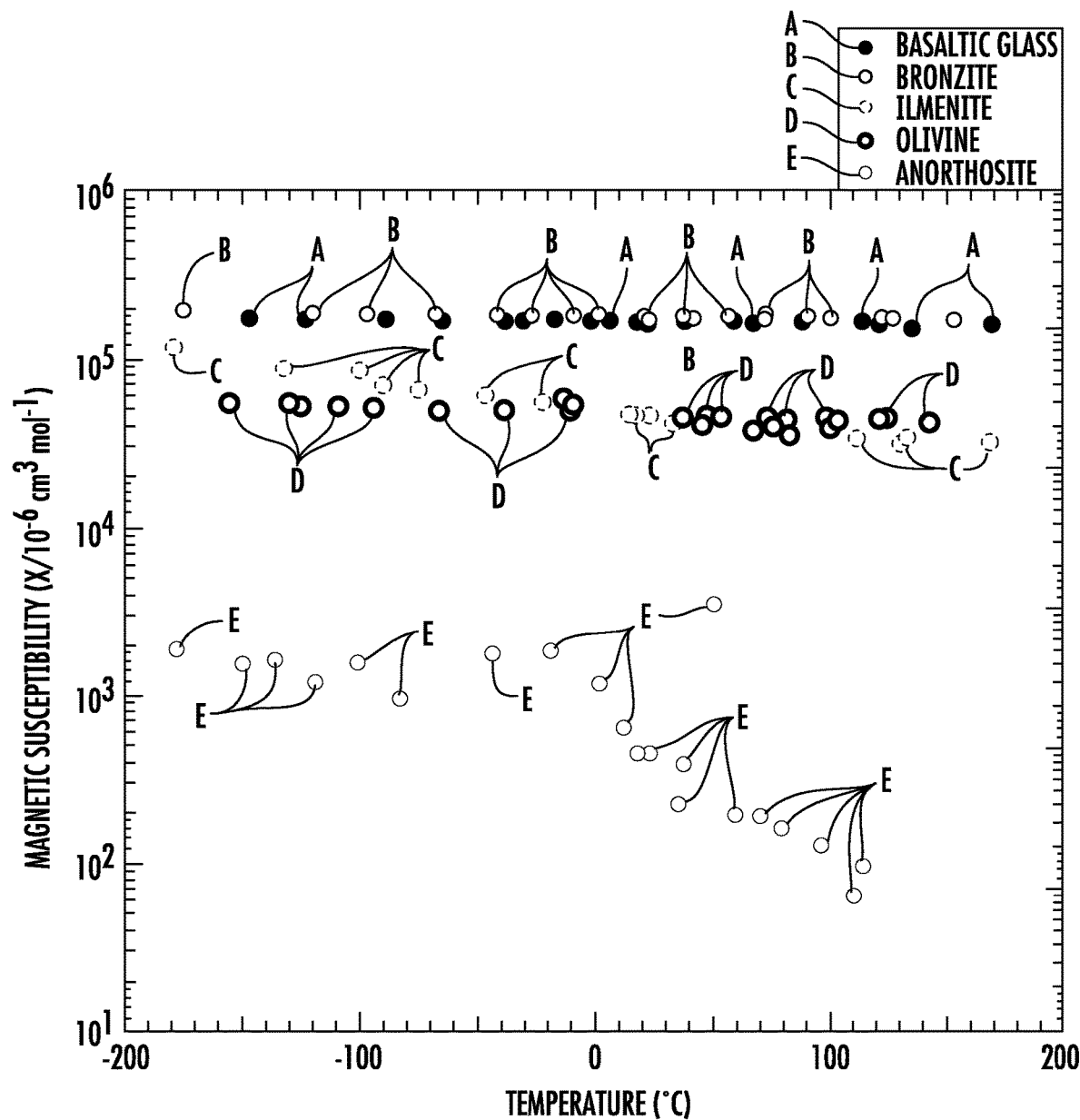
FIG. 8 is a graph showing the magnetic variation of lunar minerals.

The measured susceptibilities of the lunar minerals were found to fall under three distinct ranges as listed in Table 1 shown in FIG. 7 and illustrated in the graph of FIG. 8. The Basaltic glass and Bronzite are the most magnetic lunar minerals, followed by Ilmenite and Olivine, which are in the middle, and followed by Anorthosite and water (not shown in the plot) being the least magnetic among the lunar minerals. Each susceptibility band contained two mineral groups, and this knowledge made it useful in the next step of the beneficiation, for example, when it was possible to use electrostatic beneficiation with tribocharging, and separate those two minerals. The two slopes of variations for Anorthosite, the intersected point (~−25° C.) indicates the curie temperature for the mineral.

The graph in FIG. 8 indicates that the magnetic susceptibility is lowest for Anorthosite, but highest for Basaltic Glass and Bronzite, and mid-level to high for Ilmenite and Olivine.

Figure 9:
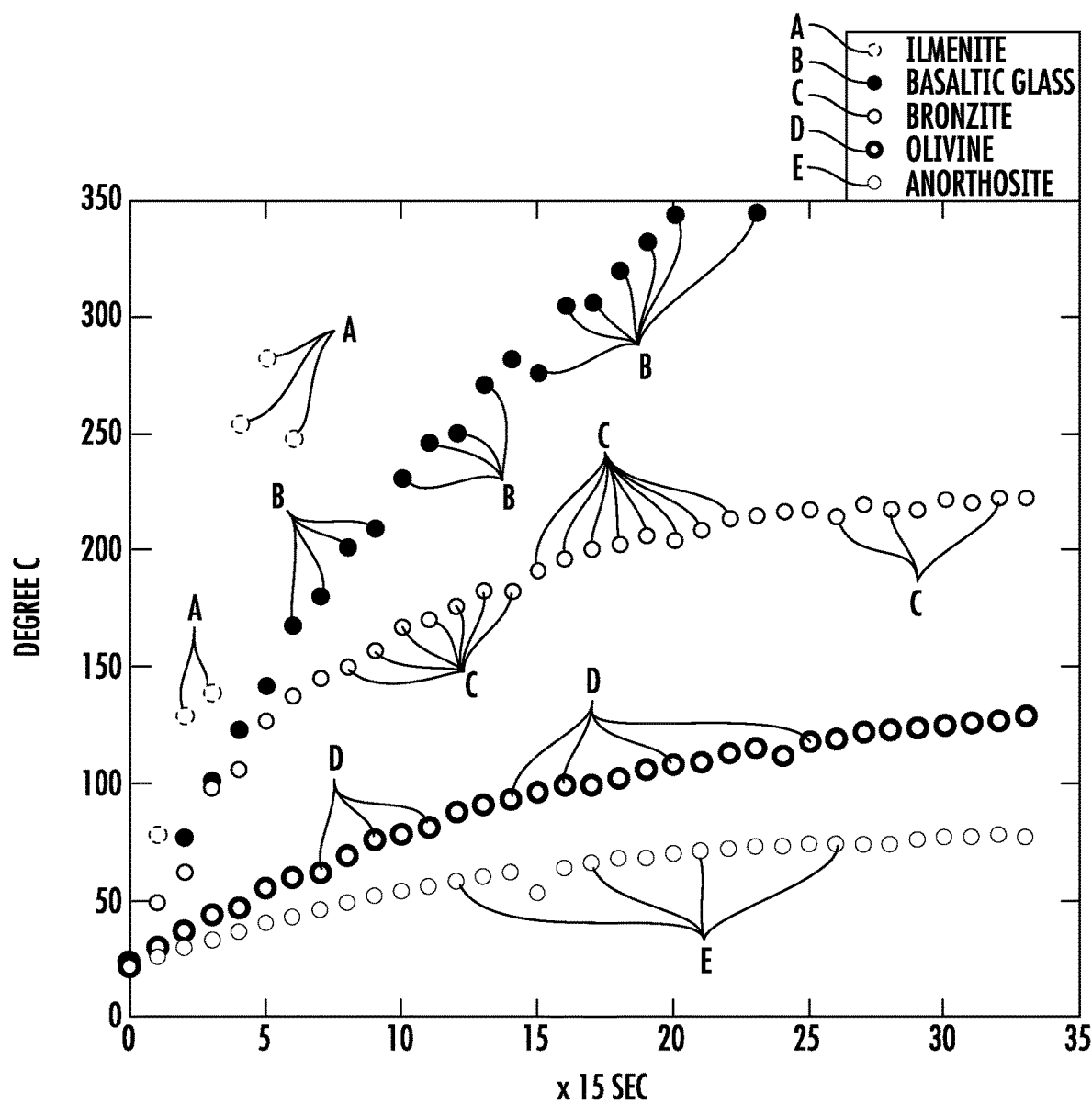
FIG. 9 is a graph showing microwave susceptibility of lunar materials.

There are also microwave susceptibilities for these lunar minerals. The testing occurred with 100 ml samples of each component of lunar simulants. In a household microwave oven of 750 watts, a spot slightly off the center for the sample holder 208 (FIG. 6) was marked and heated. The measurements were taken at time intervals of 15 seconds, and the measurements were consistent with the time interval to take the reading. Table 2 below and the graph of FIG. 9 indicate the microwave susceptibility of minerals in lunar components.

TABLE 2

MICROWAVE SUSCEPTIBILITY OF LUNAR MINERALS

| Time (×15 Sec) | Anorthosite | Basaltic Glass | Bronzite | Ilmenite | Olivine |
|---|---|---|---|---|---|
| 0 | 22 | 21 | 21 | 21 | 24 |
| 1 | 26 | 49 | 49 | 78 | 30 |
| 2 | 30 | 77 | 62 | 129 | 37 |

TABLE 2-continued

MICROWAVE SUSCEPTIBILITY OF LUNAR MINERALS

| Time (×15 Sec) | Anorthosite | Basaltic Glass | Bronzite | Ilmenite | Olivine |
|---|---|---|---|---|---|
| 3 | 33 | 101 | 98 | 139 | 44 |
| 4 | 37 | 123 | 106 | 254 | 47 |
| 5 | 40 | 142 | 127 | 282 | 55 |
| 6 | 43 | 168 | 138 | 248 | 60 |
| 7 | 46 | 180 | 145 | 416 | 62 |
| 8 | 49 | 201 | 150 | 465 | 69 |
| 9 | 52 | 209 | 157 | 487 | 76 |
| 10 | 54 | 231 | 167 | 591 | 78 |
| 11 | 56 | 246 | 170 | 760 | 81 |
| 12 | 58 | 250 | 176 | 690 | 88 |
| 13 | 60 | 271 | 182 |  | 91 |
| 14 | 62 | 282 | 182 |  | 93 |
| 15 | 53 | 276 | 191 |  | 96 |
| 16 | 64 | 305 | 196 |  | 99 |
| 17 | 66 | 306 | 200 |  | 99 |
| 18 | 68 | 320 | 202 |  | 102 |
| 19 | 68 | 332 | 206 |  | 106 |
| 20 | 70 | 344 | 204 |  | 108 |
| 21 | 71 | 354 | 208 |  | 109 |
| 22 | 72 | 358 | 213 |  | 113 |
| 23 | 73 | 345 | 214 |  | 115 |
| 24 | 73 | 369 | 216 |  | 112 |
| 25 | 74 | 375 | 217 |  | 118 |
| 26 | 74 | 364 | 214 |  | 119 |
| 27 | 74 | 401 | 219 |  | 122 |
| 28 | 74 | 407 | 217 |  | 123 |
| 29 | 76 | 405 | 217 |  | 124 |
| 30 | 77 | 422 | 221 |  | 125 |
| 31 | 77 | 413 | 220 |  | 126 |
| 32 | 78 | 421 | 222 |  | 127 |
| 33 | 77 | 422 | 222 |  | 129 |
| 34 | 79 | 431 | 226 |  | 130 |
| 35 | 79 | 437 | 227 |  | 131 |

Figure 10:
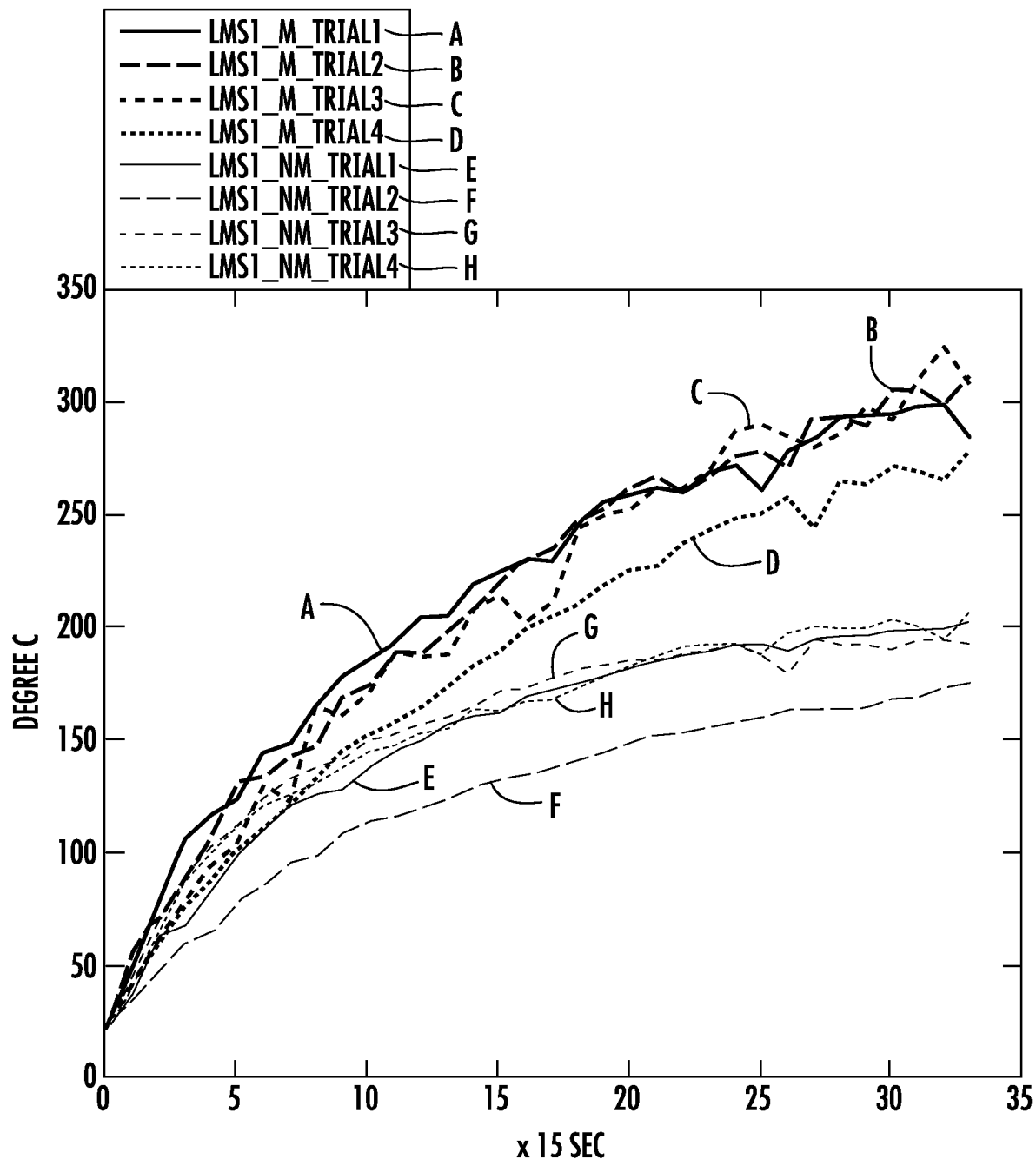
FIG. 10 is a graph showing microwave susceptibility of magnetic and non-magnetic parts of LM51.
Figure 11:
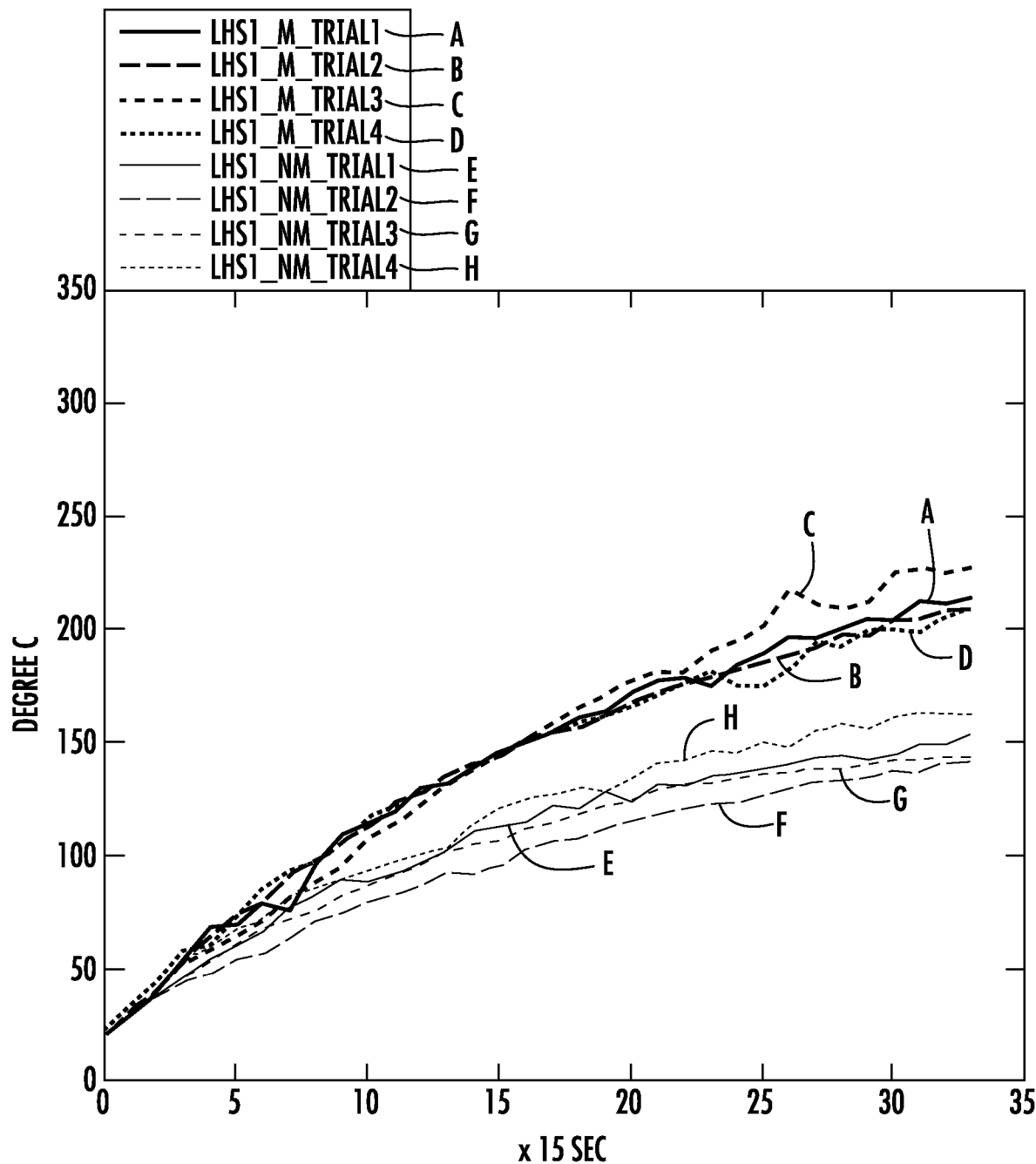
FIG. 11 is a graph showing microwave susceptibility for magnetic and non-magnetic parts of LHS1.

It was observed that except for the Ilmenite, which jumps from middle to top, there is a proportional correspondence between magnetic and microwave susceptibility. Three distinct bands were observed in microwave susceptibilities. The prototype magnetic beneficiator separated into two piles the magnetic and non-magnetic parts. The susceptibility test was performed again with a 750 watt microwave oven. The temperature with the microwave exposure for magnetic (M) and nonmagnetic (NM) parts of LMS1 and LHS1 are listed below in Table 3 and Table 4, and visualized in the graphs of FIGS. 10 and 11 respectively.

TABLE 3

MICROWAVE SUSCEPTIBILITY FOR MAGNETIC AND NONMAGNETIC PARTS OF LMS1

Temperatures ° C.

| Time (×15 Sec) | LMS1-M Trial 1 | LMS1-NM Trial 1 | LMS1-M Trial 2 | LMS1-NM Trial 2 | LMS1-M Trial 3 | LMS1-NM Trial 3 | LMS1-M Trial 4 | LMS1-NM Trial 4 |
|---|---|---|---|---|---|---|---|---|
| 0 | 21 | 21 | 21 | 22 | 21 | 21 | 22 | 21 |
| 1 | 50 | 37 | 56 | 35 | 38 | 46 | 40 | 41 |
| 2 | 79 | 63 | 72 | 47 | 62 | 70 | 61 | 65 |
| 3 | 106 | 68 | 87 | 59 | 80 | 90 | 76 | 87 |
| 4 | 117 | 85 | 107 | 65 | 95 | 103 | 88 | 100 |
| 5 | 124 | 99 | 132 | 78 | 104 | 112 | 102 | 112 |
| 6 | 145 | 111 | 134 | 86 | 131 | 125 | 112 | 121 |
| 7 | 149 | 121 | 143 | 95 | 122 | 133 | 122 | 126 |
| 8 | 166 | 126 | 147 | 99 | 165 | 138 | 133 | 131 |
| 9 | 178 | 128 | 169 | 108 | 161 | 142 | 145 | 138 |
| 10 | 185 | 138 | 174 | 114 | 170 | 150 | 153 | 145 |
| 11 | 193 | 145 | 189 | 116 | 188 | 153 | 158 | 148 |
| 12 | 204 | 150 | 188 | 120 | 187 | 157 | 165 | 153 |
| 13 | 205 | 157 | 196 | 123 | 188 | 160 | 173 | 155 |

TABLE 3-continued

MICROWAVE SUSCEPTIBILITY FOR MAGNETIC AND NONMAGNETIC PARTS OF LMS1

| Time (×15 Sec) | Temperatures ° C. | | | | | | | |
|---|---|---|---|---|---|---|---|---|
| | LMS1-M Trial 1 | LMS1-NM Trial 1 | LMS1-M Trial 2 | LMS1-NM Trial 2 | LMS1-M Trial 3 | LMS1-NM Trial 3 | LMS1-M Trial 4 | LMS1-NM Trial 4 |
| 14 | 219 | 161 | 208 | 129 | 207 | 165 | 183 | 164 |
| 15 | 224 | 162 | 220 | 133 | 214 | 172 | 189 | 163 |
| 16 | 230 | 169 | 230 | 134 | 202 | 173 | 199 | 167 |
| 17 | 229 | 172 | 234 | 137 | 210 | 177 | 204 | 168 |
| 18 | 245 | 175 | 247 | 141 | 244 | 181 | 210 | 173 |
| 19 | 256 | 178 | 253 | 145 | 250 | 183 | 219 | 178 |
| 20 | 259 | 182 | 262 | 149 | 252 | 185 | 225 | 183 |
| 21 | 262 | 185 | 267 | 152 | 262 | 185 | 227 | 187 |
| 22 | 260 | 187 | 261 | 153 | 262 | 188 | 237 | 191 |
| 23 | 269 | 189 | 267 | 156 | 270 | 189 | 243 | 192 |
| 24 | 272 | 192 | 277 | 158 | 287 | 192 | 248 | 192 |
| 25 | 261 | 192 | 278 | 160 | 290 | 187 | 251 | 188 |
| 26 | 278 | 189 | 270 | 163 | 285 | 179 | 258 | 197 |
| 27 | 284 | 194 | 292 | 164 | 280 | 194 | 244 | 200 |
| 28 | 293 | 196 | 295 | 164 | 285 | 192 | 265 | 199 |
| 29 | 295 | 196 | 290 | 164 | 298 | 192 | 264 | 199 |
| 30 | 295 | 198 | 305 | 168 | 292 | 190 | 271 | 203 |
| 31 | 298 | 199 | 306 | 169 | 310 | 194 | 270 | 200 |
| 32 | 299 | 199 | 298 | 173 | 324 | 194 | 265 | 194 |
| 33 | 284 | 202 | 312 | 175 | 308 | 192 | 278 | 206 |

TABLE 4

MICROWAVE SUSCEPTIBILITY FOR MAGNETIC AND NONMAGNETIC PARTS OF LHS1

| Time (×15 Sec) | Temperatures ° C. | | | | | | | |
|---|---|---|---|---|---|---|---|---|
| | LHS1-M Trial 1 | LHS1-NM Trial 1 | LHS1-M Trial 2 | LHS1-NM Trial 2 | LHS1-M Trial 3 | LHS1-NM Trial 3 | LHS1-M Trial 4 | LHS1-NM Trial 4 |
| 0 | 21 | 22 | 21 | 22 | 21 | 21 | 24 | 21 |
| 1 | 29 | 32 | 33 | 30 | 31 | 3 | 35 | 34 |
| 2 | 41 | 39 | 41 | 38 | 43 | 39 | 46 | 44 |
| 3 | 56 | 47 | 54 | 45 | 53 | 47 | 59 | 53 |
| 4 | 69 | 55 | 65 | 48 | 59 | 54 | 61 | 61 |
| 5 | 70 | 61 | 74 | 55 | 65 | 62 | 75 | 68 |
| 6 | 80 | 67 | 82 | 57 | 73 | 68 | 86 | 72 |
| 7 | 76 | 77 | 93 | 64 | 82 | 72 | 94 | 82 |
| 8 | 97 | 83 | 97 | 71 | 89 | 76 | 98 | 86 |
| 9 | 109 | 90 | 106 | 75 | 96 | 83 | 106 | 90 |
| 10 | 115 | 89 | 113 | 80 | 108 | 87 | 117 | 94 |
| 11 | 120 | 92 | 124 | 83 | 114 | 92 | 122 | 98 |
| 12 | 130 | 97 | 128 | 87 | 123 | 96 | 129 | 101 |
| 13 | 132 | 103 | 136 | 93 | 131 | 102 | 135 | 104 |
| 14 | 140 | 111 | 141 | 92 | 138 | 105 | 140 | 114 |
| 15 | 146 | 113 | 144 | 96 | 145 | 107 | 147 | 121 |
| 16 | 150 | 115 | 152 | 103 | 152 | 112 | 151 | 125 |
| 17 | 155 | 122 | 154 | 106 | 159 | 115 | 154 | 127 |
| 18 | 161 | 121 | 157 | 108 | 166 | 118 | 159 | 130 |
| 19 | 164 | 128 | 162 | 112 | 171 | 122 | 162 | 128 |
| 20 | 172 | 124 | 168 | 115 | 177 | 124 | 166 | 134 |
| 21 | 177 | 131 | 172 | 118 | 181 | 129 | 171 | 141 |
| 22 | 178 | 131 | 176 | 121 | 181 | 131 | 176 | 142 |
| 23 | 175 | 135 | 179 | 123 | 191 | 132 | 181 | 146 |
| 24 | 184 | 136 | 182 | 123 | 195 | 134 | 175 | 145 |
| 25 | 189 | 138 | 185 | 126 | 201 | 136 | 175 | 150 |
| 26 | 196 | 140 | 189 | 130 | 218 | 137 | 182 | 148 |
| 27 | 196 | 143 | 192 | 132 | 211 | 138 | 194 | 155 |
| 28 | 200 | 144 | 197 | 133 | 209 | 138 | 192 | 158 |
| 29 | 204 | 142 | 197 | 134 | 211 | 140 | 199 | 156 |
| 30 | 204 | 144 | 203 | 137 | 225 | 142 | 200 | 161 |
| 31 | 212 | 149 | 204 | 137 | 226 | 142 | 198 | 163 |
| 32 | 211 | 149 | 208 | 140 | 225 | 143 | 205 | 163 |
| 33 | 213 | 153 | 209 | 141 | 227 | 143 | 209 | 162 |

Testing was accomplished to measure the specific heat of the simulants as shown in Table 5. These measured values were 20% higher than published values found in literature. Measurement in specific heat was sensitive with heat loss. Further improvements of the system and further testing may continue to measure the specific heat for all the components of simulants.

TABLE 5

SPECIFIC HEAT OF LUNAR SIMULANTS

| | Specific heat J/Kg/K | | |
|---|---|---|---|
| | Trial 1 | Trial 2 | Average |
| LMS1 | 937.22 | 1097.3 | 1017.26 |
| LHS1 | 1348.87 | 1078.52 | 1213.695 |
| LMS1-NM | 1342.08 | | |
| LMS-M | 1570.14 | | |
| LHS1-NM | 1243.88 | | |
| LHS1-M | 1737.47 | | |
| Ilmenite | 1372.03 | | |
| Basaltic Glass | 1463.84 | | |

Sintering experiments were conducted under testing where a long exposure to microwave energy was performed to sinter the high accepting minerals. Early tests with regular ceramic bowls as a container failed to break them within 10 minutes before reaching the sintering temperature. The surface temperature appeared to stabilize with radiation loss around 450° C., but a much higher internal temperature was expected. It is possible to scale up the microwave power and track the temperature and structures to contain the heat. Mechanical heat containing designs were planned and investigated: 1) stacked: 1-2 inch layer of magnetic minerals on top of a non-magnetic base; 2) convoluted: a thick layer of non-magnetic minerals surrounded the magnetic minerals at the center; and 3) sandwiched: a thin layer of non-magnetic minerals were on top of the stacked design to minimize the radiation loss from the top. The thickness of layers, exposed area and exposure times were variables in these cases.

Figure 12:
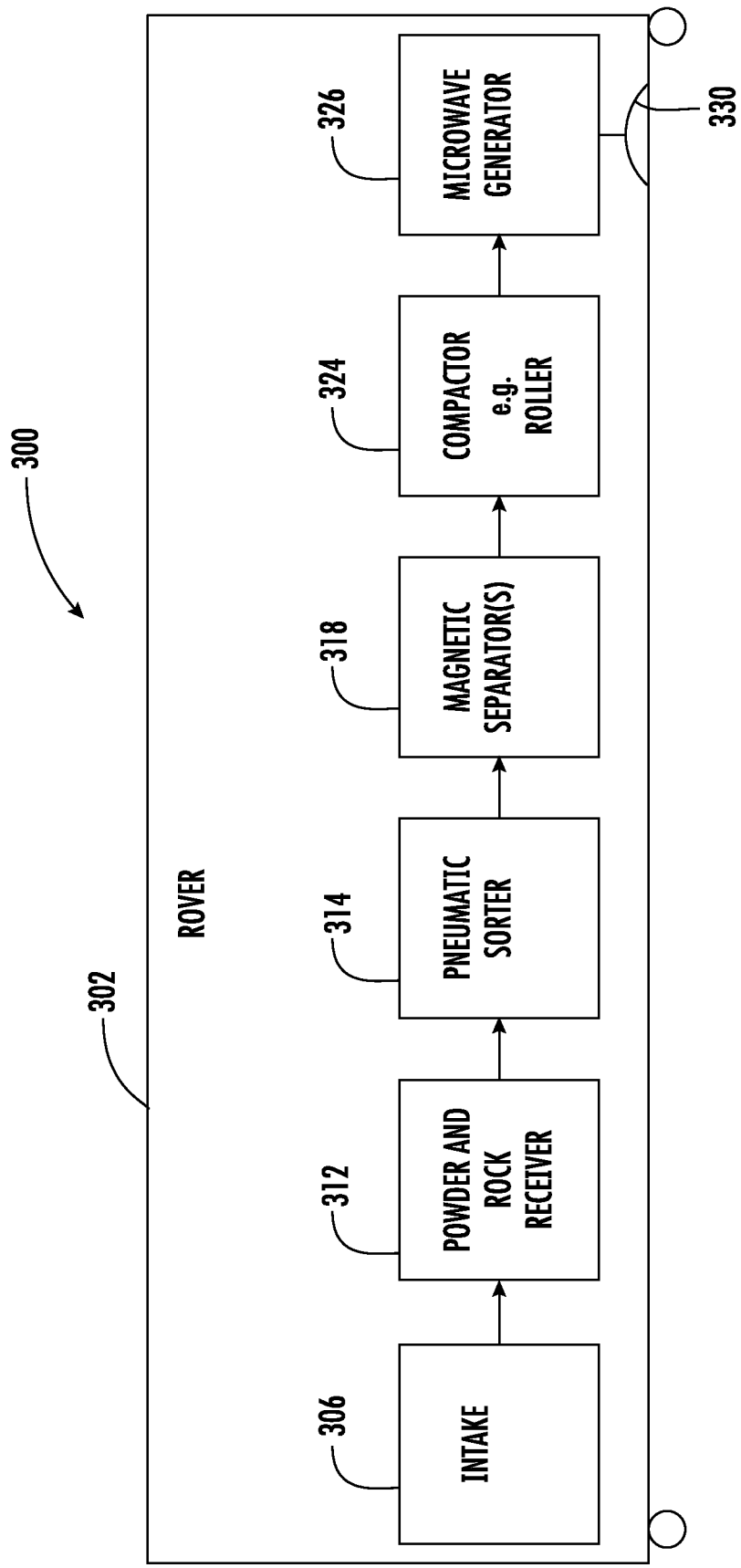
FIG. 12 is a high-level block diagram of a system for constructing a building material from lunar soil.

Referring now to FIG. 12, there is illustrated an example system 300 that may be used to construct a building material from lunar soil. A rover 302 includes regolith intake 306, a powder and rock receiver 310, pneumatic sorter 314, and one or more magnetic separators 318. A compactor or a roller 324 in this example may be used for compacting different lunar soil layers, followed by generating microwave energy in a microwave generator 326 and applying microwave energy onto the layer via an antenna 330.

In this example, the pneumatic sorter 314 pneumatically sorts the lunar soil into a coarser fraction of lunar soil and a dust fraction of lunar soil. The one or more magnetic sorters or separators 318 magnetically shorts the coarser fraction and the dust fraction. The compactor or roller 324 may include equipment to lay down the sublayer and top layer or even multiple top layers, which are then microwaved. Components such as described in the incorporated by reference '277 application may be used.

It is possible to use a microwave energy flux of about 200 kW/m$^2$ using a magnetron and horn antenna. A model may use finite difference cells of 1 mm thickness and time steps of 0.3 seconds may be used, such as to reach an average temperature within the desired sintering depth reached 1200° C. For example, this could be a lunar landing pad. An outer pad of 1 cm could be used with an inner pad of 3 cm. An energy per area of 21.73 kWh/m$^2$ may be used for the 3 cm thick sintered layer.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

The invention claimed is:

1. A method of constructing a building material from lunar soil, comprising:
    magnetically sorting the lunar soil and creating a layered surface comprising a microwave susceptible, thermal conductive top layer of lunar soil, and a poorly microwave-susceptible and poorly thermally conductive sublayer of lunar soil; and
    sintering the microwave susceptible, thermal conductive top layer of lunar soil by directing microwave energy onto the top layer of lunar soil.

2. The method of claim 1 wherein the top layer of lunar soil comprises a plurality of layers of varying microwave susceptibility to optimize the effectiveness of the microwave sintering.

3. The method of claim 1 wherein directing the microwave energy onto the top layer of lunar soil comprises generating microwave energy, and directing the microwave energy through an antenna in a direction onto the top layer of lunar soil.

4. The method of claim 3 comprising generating different wavelengths of microwave energy in time corresponding to the changing absorbance of the top layer of the lunar soil as a function of temperature during the heating process of the top layer of lunar soil, and directing the microwave energy of different wavelengths in timed sequence onto the top layer of lunar soil.

5. The method of claim 1 wherein the top layer of lunar soil is compacted to a greater extent than the sublayer of lunar soil.

6. The method of claim 1 wherein the lunar soil is magnetically sorted into a non-magnetic isolate to form the sublayer of lunar soil, and into a magnetic isolate to form the top layer of lunar soil.

7. The method of claim 6 wherein the lunar soil is pneumatically sorted into a coarse fraction and dust fraction, followed by magnetically sorting the coarse fraction into a magnetic isolate and non-magnetic isolate.

8. The method of claim 7 wherein the dust fraction is magnetically sorted into fractions of magnetic dust isolates and mixed with the magnetic isolate before forming the top and sublayers of lunar soil.

9. A method of constructing a building material from lunar soil, comprising:
    pneumatically sorting the lunar soil into a coarser fraction of lunar soil and a dust fraction of lunar soil;
    magnetically sorting the coarser fraction of lunar soil into a non-magnetic isolate and a magnetic isolate and magnetically sorting the dust fraction of lunar soil into a less-magnetic dust isolate and more-magnetic dust isolate;
    laying down a sublayer from the non-magnetic isolate and less-magnetic dust isolate;
    laying down a top layer from the magnetic isolate and more-magnetic dust isolate to create a layered surface comprising a microwave susceptible, thermal conductive top layer of lunar soil, and a poorly microwave-susceptible and poorly thermally conductive sublayer of lunar soil; and sintering the microwave susceptible, thermal conductive top layer of lunar soil by directing microwave energy onto the top layer of lunar soil.

10. The method of claim 9 wherein the top layer of lunar soil comprises a plurality of layers of varying microwave susceptibility to optimize the effectiveness of the microwave sintering.

11. The method of claim 9 wherein directing the microwave energy onto the top layer of lunar soil comprises generating microwave energy, and directing the microwave energy through an antenna in a direction onto the top layer of lunar soil.

12. The method of claim 11 comprising generating different wavelengths of microwave energy in time corresponding to the changing absorbance of the top layer of the lunar soil as a function of temperature during the heating process of the top layer of lunar soil, and directing the microwave energy of different wavelengths in timed sequence onto the top layer of lunar soil.

13. The method of claim 9 wherein the top layer of lunar soil is compacted to a greater extent than the sublayer of lunar soil.

14. A system of constructing a building material from lunar soil, comprising:
a magnetic separator that magnetically sorts the lunar soil into a non-magnetic isolate and magnetic isolate;
a compactor configured to create a layered surface comprising a microwave susceptible, thermal conductive top layer of lunar soil formed from the magnetic isolate and a poorly microwave-susceptible and poorly thermally conductive sublayer of lunar soil from the non-magnetic isolate;
a microwave generator configured to generate microwave energy; and
an antenna connected to the microwave generator and configured to direct the microwave energy against the microwave susceptible, thermal conductive top layer of lunar soil and sinter the top layer of lunar soil.

15. The system of claim 14 wherein the top layer of lunar soil comprises a plurality of layers of varying microwave susceptibility to optimize the effectiveness of the microwave sintering.

16. The system of claim 14 wherein said microwave generator is configured to generate microwave energy to sinter the top layer of lunar soil.

17. The system of claim 16 wherein said microwave generator is configured to generate different wavelengths of microwave energy in timed sequence corresponding to the changing absorbance of the top layer of the lunar soil as a function of temperature during the heating process of the top layer of lunar soil.

18. The system of claim 14 wherein the compactor is configured to compact the top layer of lunar soil to a greater extent than the sublayer of lunar soil.

19. The system of claim 14 comprising a pneumatic separator configured to pneumatically sort the lunar soil before magnetic separation into a coarse fraction and dust fraction.

20. The system of claim 19 wherein the magnetic sorter is configured to magnetically sort the dust fraction of the lunar soil into fractions of magnetic dust isolates and mixed with the magnetic isolate before forming the top and sublayers of lunar soil.

21. The system of claim 14 wherein the microwave generator is configured to generate microwave energy to achieve a temperature in the microwave susceptible, thermal conductive top layer of lunar soil of about 1200° K to 1600° K.

22. The system of claim 21 wherein the microwave generator is configured to generate microwave energy to achieve a thermal conductivity of about 70 to 110 mW/m/K.

* * * * *